US011455835B2

(12) United States Patent
Ohnishi et al.

(10) Patent No.: US 11,455,835 B2
(45) Date of Patent: Sep. 27, 2022

(54) INFORMATION PROCESSING APPARATUS AND INFORMATION PROCESSING METHOD

(71) Applicant: PANASONIC INTELLECTUAL PROPERTY CORPORATION OF AMERICA, Torrance, CA (US)

(72) Inventors: Ryota Ohnishi, Hyogo (JP); Hiroaki Urabe, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 669 days.

(21) Appl. No.: 16/552,529

(22) Filed: Aug. 27, 2019

(65) Prior Publication Data

US 2020/0074159 A1 Mar. 5, 2020

(30) Foreign Application Priority Data

Aug. 30, 2018 (JP) .............................. JP2018-161784
Apr. 22, 2019 (JP) .............................. JP2019-081257

(51) Int. Cl.
*E05F 15/73* (2015.01)
*G06V 40/20* (2022.01)
(Continued)

(52) U.S. Cl.
CPC .............. *G06V 40/23* (2022.01); *E05F 15/73* (2015.01); *G06V 20/20* (2022.01); *G06V 20/56* (2022.01); *B60K 37/06* (2013.01); *B60K 2370/1438* (2019.05); *E05F 2015/767* (2015.01); *E05Y 2400/44* (2013.01); *E05Y 2400/45* (2013.01); *E05Y 2400/85* (2013.01); *E05Y 2900/506* (2013.01); *G05D 1/0088* (2013.01); *G05D 2201/0212* (2013.01)

(58) Field of Classification Search
CPC ........ G06V 40/23; G06V 20/20; G06V 20/56; E05F 15/73; E05F 2015/767; B60K 2370/1438; B60K 37/06; E05Y 2400/44; E05Y 2400/45; E05Y 2400/85; E05Y 2900/506; G05D 1/0088; G05D 2201/0212
See application file for complete search history.

(56) References Cited

U.S. PATENT DOCUMENTS

2016/0171313 A1 6/2016 Huang et al.
2018/0129981 A1 5/2018 Fujimoto

FOREIGN PATENT DOCUMENTS

JP 11-334608 12/1999

OTHER PUBLICATIONS

Dec. 17, 2019 Extended European Search Report in European Application No. 19193788.7.

*Primary Examiner* — Mathew Franklin Gordon
(74) *Attorney, Agent, or Firm* — Greenblum & Bernstein, P.L.C.

(57) ABSTRACT

An information processing apparatus includes a first acquisition unit that acquires first sensing data from a first sensor that performs sensing of an object outside a vehicle, a presentation control unit that generates presentation information based on the first sensing data and causes a presentation device present in the vehicle to present the presentation information, a second acquisition unit that acquires input data for presentation of the presentation information via an input device present in the vehicle, and a boarding control unit that controls boarding of a person on the vehicle according to the input data acquired by the second acquisition unit.

13 Claims, 12 Drawing Sheets

(51) Int. Cl.
G06V 20/20 (2022.01)
G06V 20/56 (2022.01)
*G05D 1/00* (2006.01)
*B60K 37/06* (2006.01)

FIG. 1
[OUTSIDE OF VEHICLE]
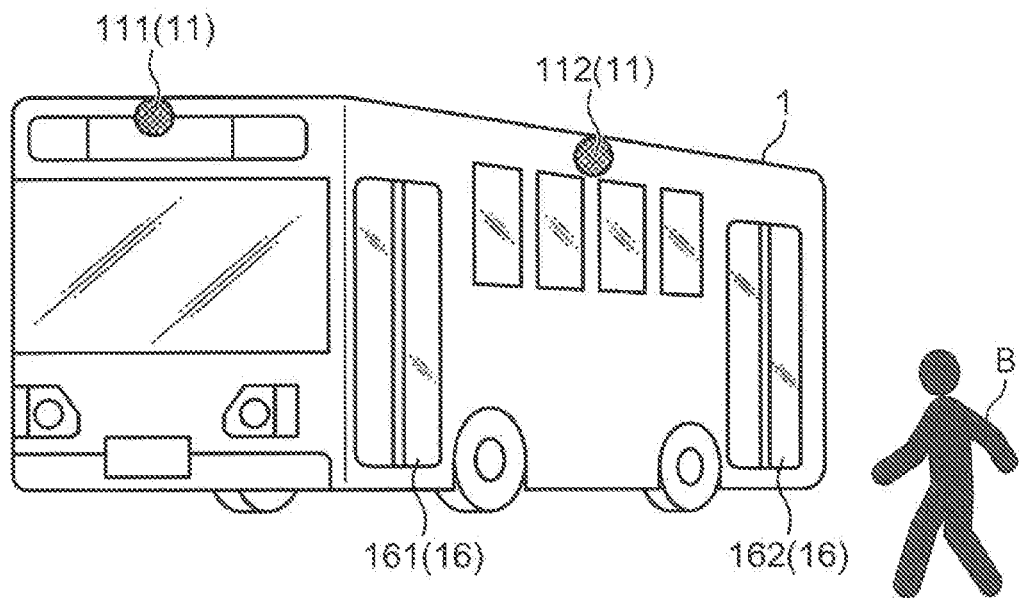
[INSIDE OF VEHICLE]
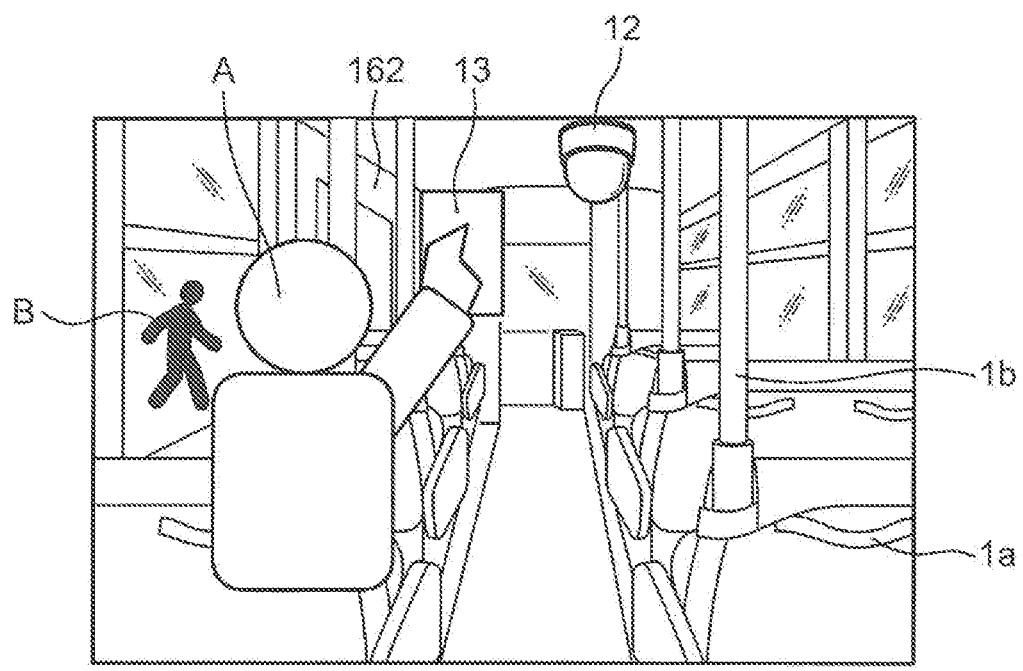

INFORMATION PROCESSING APPARATUS AND INFORMATION PROCESSING METHOD

FIELD OF THE INVENTION

The present disclosure relates to a technique for controlling a vehicle.

BACKGROUND ART

Japanese Patent Application Laid-Open No. 11-334608 discloses an automatic traveling cart that is capable of unmanned automatic traveling and also allows a person to get on it. Specifically, Japanese Patent Application Laid-Open No. 11-334608 discloses a technique that includes a switching lever that instructs switching between manual traveling and automatic traveling, and starts automatic traveling when the switching lever is turned to the automatic side.

However, in Japanese Patent Application Laid-Open No. 11-334608, it may be difficult for an unspecified user to use a vehicle traveling automatically. For example, in Japanese Patent Application Laid-Open No. 11-334608, since a specific person who is a cart user is assumed as the user, operation of the switching lever means that the user has completed boarding.

Therefore, when an unspecified person is the user, it is difficult to determine whether or not the user who uses the vehicle has completed boarding based on operation the switching lever. This may cause the user to be left behind or a vehicle to depart while the user is still getting on the vehicle. Japanese Patent Application Laid-Open No. 11-334608 needs improvement in this respect.

SUMMARY OF THE INVENTION

The present disclosure has been made to solve the above-described problems, and an object thereof is provide a technique that suppresses an unspecified user who intends to get on an automatic driving vehicle from being left behind or improves the safety of the user.

An information processing apparatus according to an aspect of the present disclosure includes a first acquisition unit that acquires first sensing data from a first sensor that performs sensing of an object outside a vehicle, a presentation control unit that generates presentation information based on the first sensing data and causes a presentation device present in the vehicle to present the presentation information, a second acquisition unit that acquires input data for presentation of the presentation information via an input device present in the vehicle, and a boarding control unit that controls boarding of a person on the vehicle according to the input data acquired by the second acquisition unit.

BRIEF DESCRIPTION OF THE DRAWINGS

FIG. 1 is a diagram of a vehicle to which an information processing apparatus according to a first embodiment of the present disclosure is applied, illustrating an example of an external configuration of the vehicle and an internal configuration of the vehicle;

Figure 2:
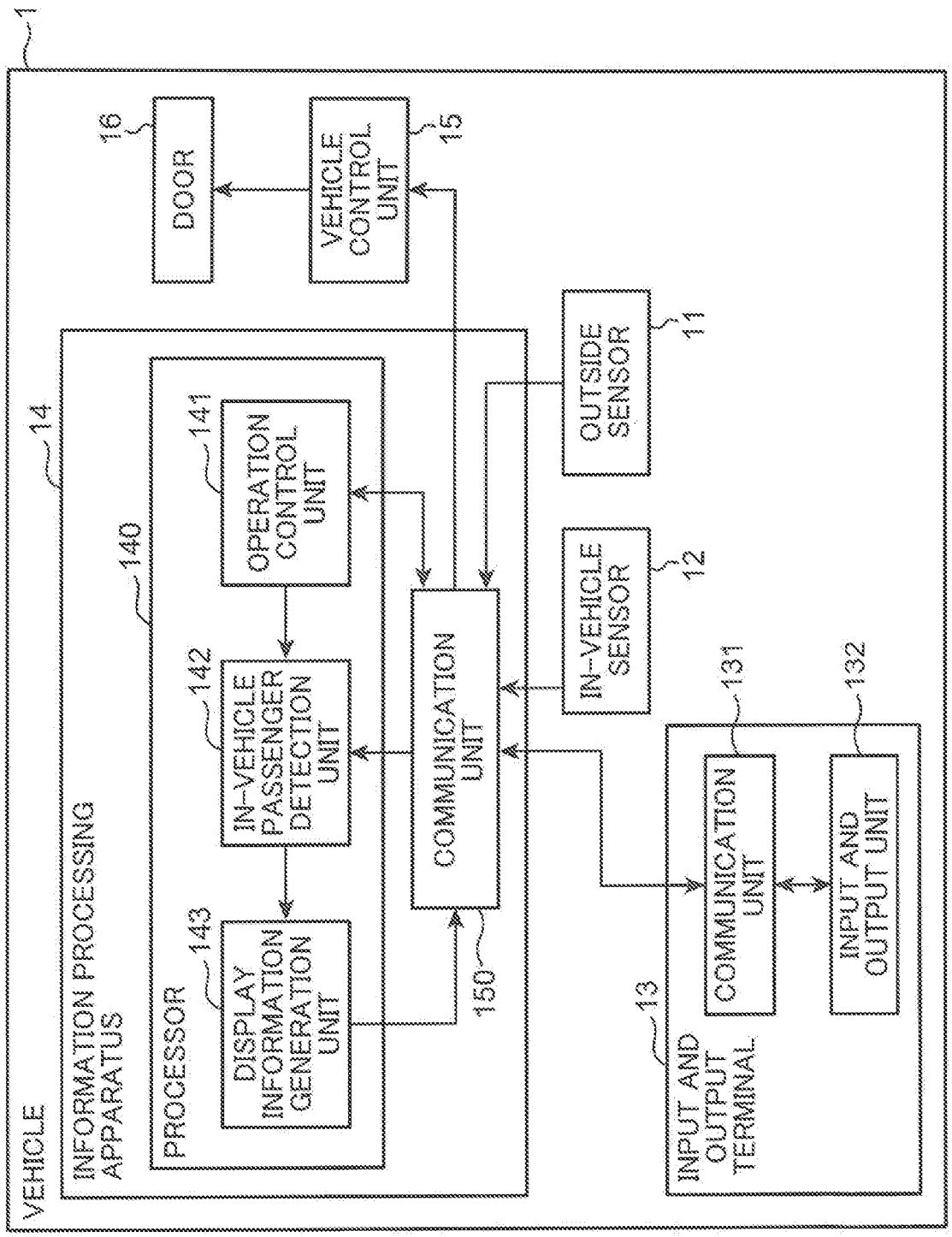
FIG. 2 is a block diagram illustrating a configuration of the vehicle illustrated in FIG. 1.

DESCRIPTION OF EMBODIMENT (Process Leading to the Present Disclosure)

In recent years, with the development of artificial intelligence (AI) technology, research on ride share services using driverless self-driving cars has been advanced. There is a route bus service as one form of such ride share services. When a route bus is operated automatically, a computer performs various tasks conventionally performed by human drivers; however, it is not easy to make the computer carry out these tasks.

For example, since there is a bus stop for a route bus, and a plurality of route buses traveling in different routes come and go at the bus stop, a driver of a bus determines whether a person at the bus stop is trying to get on the bus, or not trying to get on the bus. Then, in a case of determining that this person is trying to get on the bus, the driver starts traveling of the bus after waiting for the person to get on the bus completely in order to allow the person to get on the bus safely without leaving behind the person.

Further, at a bus stop, there is also a person who runs to the bus just before a departure time. For this reason, in a case where there is a person who walks around the bus, the driver also determines whether or not this person is trying to get on the bus before starting traveling of the bus.

As described above, in order to allow a passenger to get on the bus safely without leaving behind the passenger at the bus stop, the driver comprehensively judges various situations around the bus, such as a behavior, an expression, and a position of a person around the bus, before starting traveling of the bus. However, it is technically difficult for a computer to make such comprehensive judgments, and it is often difficult to fully automate a route bus.

The above-mentioned Japanese Patent Application Laid-Open No. 11-334608 is a technique related to a cart used in a golf course. In such a cart, automatic driving is started when a certain person who is on the cart instructs the cart to start traveling after a specific person who is an acquaintance gets on the cart. Therefore, in Japanese Patent Application Laid-Open No. 11-334608, it is not possible to assume a situation in which an unspecified person who is not an acquaintance runs to the cart just before a departure time, and the above-mentioned problem does not occur.

In view of the above, the inventor of the present invention has arrived at the present disclosure with an idea that leaving behind of an unspecified user who tries to get on an automatic driving vehicle can be suppressed or safety in getting on the vehicle can be improved not by causing only a computer to make such judgments, but by obtaining cooperation of a passenger of a route bus.

An information processing apparatus according to an aspect of the present disclosure includes a first acquisition unit that acquires first sensing data from a first sensor that performs sensing of an object outside a vehicle, a presentation control unit that generates presentation information based on the first sensing data and causes a presentation device present in the vehicle to present the presentation information, a second acquisition unit that acquires input data for presentation of the presentation information via an input device present in the vehicle, and a boarding control unit that controls boarding of a person on the vehicle according to the input data acquired by the second acquisition unit.

According to the present configuration, the presentation information is presented using the first sensing data obtained by the sensor performing sensing of an object outside the vehicle, input for the presentation information is acquired, and the boarding of the vehicle is controlled according to the input. In this manner, for example, it is possible to cause a person in the vehicle to input a determination result as to the presence or absence of a person who is trying to get on the vehicle, and to control boarding of a person who is trying to get on the vehicle in accordance with input content. Therefore, in the present configuration, determination made by a person in the vehicle can be used for the determination processing as to the presence or absence of a person trying to get on the vehicle, and leaving behind of a person trying to get on the vehicle can be suppressed or safety in getting on the vehicle can be improved.

In the above aspect, the configuration may be such that the presentation information includes an image, the input data includes operation data indicating operation on an operation image, and the presentation control unit generates the operation image.

According to the present configuration, since the presentation information can include an image showing an object outside the vehicle, a person in the vehicle can appropriately determine the presence or absence of a person who is trying to get on the vehicle by looking at the image, and can easily input a determination result by using the operation image.

In the above aspect, the configuration may be such that the operation image includes an image for operating an entrance door of the vehicle, and the boarding control unit controls the entrance door according to operation indicated by the operation data.

According to the present configuration, since an operation image for operating an entrance door of the vehicle can be presented, it is possible to directly perform physically boarding control by the operation of a person in the vehicle. For example, in a case of determining that there is a person who is trying to get on the vehicle, a person in the vehicle can allow the person to get on the vehicle safely without leaving behind the person by inputting operation of not closing a door. On the other hand, in a case of determining that there is no person who is trying to get on the vehicle, a person in the vehicle can allow the vehicle to depart promptly by inputting operation of closing a door.

In the above aspect, the configuration may be such that the operation image includes an image for selecting whether or not there is a person who is trying to get on the vehicle, and the boarding control unit controls an entrance door of the vehicle according to operation indicated by the operation data.

According to the present configuration, since an operation image for selecting the presence or absence of a person who is trying to get on the vehicle is displayed, it is possible to indirectly perform physically boarding control by the operation of a person in the vehicle. In this manner, it is psychologically difficult for the person in the vehicle to make a determination not to allow a person to get on the vehicle, and it is possible to make it easier for a person who is trying to get on the vehicle to get on than in the case where the opening and closing operation of the entrance door is performed. Therefore, it is possible to suppress leaving behind of a person who is trying to get on the vehicle.

In the above aspect, the presentation information may include an image that emphasizes a person shown in an image.

According to the present configuration, since the presentation information includes an image in which a person shown in the image is highlighted, a person in the vehicle can easily determine the presence or absence of a person who is trying to get on the vehicle. As a result, misjudgment is suppressed, and it is possible to suppress leaving behind of a person who is trying to get on the vehicle and ensure the safety of the person.

In the above aspect, the presentation information may include an image showing movement of a person shown in an image.

According to the present configuration, for example, since the presentation information includes an image indicating movement of a person shown in the image, a person in the vehicle can accurately determine the presence or absence of a person who is running to the vehicle. As a result, misjudgment is suppressed, and it is possible to suppress leaving behind of a person who is trying to get on the vehicle and ensure the safety of the person.

In the above aspect, the configuration may be such that the first acquisition unit further acquires second sensing data from a second sensor that is attached to the vehicle and performs sensing of the inside of the vehicle, the information processing apparatus further includes an identification unit configured to identify a person in the vehicle using the second sensing data, and the presentation control unit causes the presentation device to present the presentation image to the identified person.

According to the present configuration, a specific person in the vehicle is identified using the second sensing data acquired by the sensor attached to the vehicle, and the identified person can be caused to determine the presence or absence of a person who is trying to get on the vehicle. Therefore, the determination of, for example, a person who is positioned near the input device, a person whose determination is deemed reliable, a person who is at a position at which a person who is trying to get on the vehicle can be easily visually observed, and the like can be used, and the reliability of the determination can be enhanced.

In the above aspect, the identification unit may identify a person by using a history of the input data.

According to the present configuration, since a person is identified from the past input history, for example, it is possible to cause a person whose determination is reliable based on the past input history to determine the presence or absence of a person who is trying to get on the vehicle, and the reliability of the determination can be enhanced.

In the above aspect, the configuration may be such that the first acquisition unit further acquires second sensing data from a second sensor that is attached to the vehicle and performs sensing of the inside of the vehicle, the information processing apparatus further includes a determination unit configured to determine whether or not there is a person in the vehicle using the second sensing data, and the presentation control unit causes the presentation device to present the presentation information in a case where the determination unit determines that there is the person in the vehicle.

According to the present configuration, since the presentation information can be presented when there is a person in the vehicle, it is possible to prevent the presentation information from being presented when there is no person in the vehicle, and generation of unnecessary processing can be prevented.

In the above aspect, the information processing apparatus may further include an operator identification unit configured to identify a person who has made an input to the input device, and an incentive provision unit configured to provide an incentive to the identified person.

According to the present configuration, an incentive is provided to a person who inputs a determination result. Accordingly, a person in the vehicle can be provided with motivation to input a determination result as to the presence and absence of a person who is trying to get on the vehicle, and a situation where no determination result is input can be avoided.

In the above aspect, the configuration may be such that the input device includes a communication terminal which is carried by a person in the vehicle and communicates with the information processing apparatus, and the second acquisition unit acquires the input data from the communication terminal through communication.

According to the present configuration, since a determination result as to a person who is trying to get on the vehicle can be input from the communication terminal of a person in the vehicle, the input can be easily performed by the person. Further, since the input device does not need to be installed in the vehicle, the cost can be reduced.

In the above aspect, the configuration may be such that the presentation device includes a communication terminal which is carried by a person in the vehicle and communicates with the information processing apparatus, the second acquisition unit transmits the presentation information to the communication terminal, and the communication terminal presents the transmitted presentation information.

According to the present configuration, since the presentation information is displayed on the communication terminal of a person in the vehicle, it is possible to easily cause the person to determine the presence or absence of a person who is trying to get on the vehicle. Further, since the presentation device does not need to be installed in the vehicle, the cost can be reduced.

The present disclosure can also be realized as an information processing method, a computer program, or a system operated by the computer program, that cause a computer to execute characteristic configurations included in such an information processing apparatus. Further, it goes without saying that such a computer program can be distributed via a computer-readable non-transitory recording medium, such as a CD-ROM, or a communication network, such as the Internet.

Note that all embodiments described below show one specific example of the present disclosure. Numerical values, shapes, constituents, steps, order of steps, and the like described in the embodiments below are merely examples, and are not intended to limit the present disclosure. Further, among the constituents in the embodiments below, constituents not described in an independent claim indicating the highest concept are described as optional constituents. Further, in all the embodiments, the content of each can be combined with one another.

First Embodiment

FIG. 1 is a diagram of a vehicle 1 to which an information processing apparatus according to a first embodiment of the present disclosure is applied, illustrating an example of an external configuration of the vehicle 1 and an internal configuration of the vehicle 1. In FIG. 1, an upper diagram shows the external configuration of the vehicle 1, and a lower diagram shows the internal configuration of the vehicle 1. In the present embodiment, a route bus is employed as the vehicle 1. Further, the vehicle 1 is configured by a driverless automatic driving vehicle that is automatically driven by a computer mounted with AI.

Referring to the upper diagram of FIG. 1, the vehicle 1 includes outside sensors 11 and doors 16. In the example of the upper diagram of FIG. 1, the outside sensors 11 includes an outside sensor 111 provided in an upper part of a front of the vehicle 1 and an outside sensor 112 installed in an upper part of the center of a side of the vehicle 1. Note that the outside sensor 112 may be provided not on the vehicle 1 but in a different location from the vehicle. For example, the outside sensor 112 may be provided in a location, such as a building facing a road or a bus stop, where sensing of the outside of the vehicle 1 can be performed.

The doors 16 include a door 161 provided in a from part of the side of the vehicle 1 and a door 162 provided in a rear part of the side of the vehicle 1. Here, the door 161 is used when a passenger gets off the vehicle 1, and the door 162 is used when a passenger gets on the vehicle 1. However, this is an example. For example, the door 161 may be used when a passenger gets on the vehicle 1 and the door 162 may be used when a passenger gets off the vehicle 1.

The outside sensor 111 is used to detect art object in front of the vehicle 1 (for example, another vehicle, a person, and the like) and to acquire sensing data necessary for automatically driving the vehicle 1. Here, the outside sensor 111 is provided in the upper part on the front of the vehicle 1. However, this is an example, and the outside sensor 111 may be further provided on a rear of the vehicle 1 in order to detect an object behind the vehicle 1.

The outside sensor 112 is used to obtain sensing data necessary to determine whether or not there is a person who tries to get on the vehicle 1. Here, the outside sensor 112 is installed in the upper part of the side of the vehicle. However, this is an example, and the outside sensor 112 may be installed at any position as long as a person who tries to get on the vehicle 1 can be detected from the position. For example, the outside sensor 112 may be installed on the side of the vehicle 1 and around the door 16. For example, for a route bus for which a passenger uses the door 161 in the front part to get on, the outside sensor 112 may be installed in the upper part of the door 161, and for a route bus for which a passenger uses the door 162 in the rear part to get on, the outside sensor 112 may be installed in the upper part of the door 162. Alternatively, the outside sensor 112 may be installed for both the door 161 and the door 162.

Referring to the lower diagram of FIG. 1, a plurality of seats 1a for seating a passenger and a plurality of pipes 1b that are provided to stand from an upper end on the side of the seats 1a toward a ceiling are provided in the inside of the vehicle 1. A plurality of the seats 1a are arranged in a longitudinal direction of the vehicle across an aisle. An input and output terminal 13 and an in-vehicle sensor 12 are provided inside the vehicle 1.

The input and output terminal 13 (an example of an input device) includes, for example, a processor, such as a CPU, a display device, such as a liquid crystal panel, and an information processing apparatus including an input device, such as a touch panel, to which operation from a passenger is input. The input and output terminal 13 displays an image based on which a passenger A in the vehicle 1 determines the presence or absence of a person B who tries to get on the vehicle 1 when the vehicle 1 is about to depart at the bus stop. Further, the input and output terminal 13 displays an operation image for receiving operation of the passenger A to input a determination result by the passenger A. In this example, the vehicle 1 stops at the bus stop, and the person B runs to the door 162. Therefore, the passenger A determines that there is the person B who tries to get on the vehicle 1, and inputs, in the vehicle 1, a determination result that the person B is present. In this manner, the vehicle 1 departs from the bus stop after confirming that the passenger B has finished getting on the vehicle. Therefore, the vehicle 1 can allow the person B to get on without leaving behind the person B at the bus stop.

Here, although one of the input and output terminal 13 is installed on the pipe 1b provided in the vicinity of the door 162 that is used when a passenger gets on the vehicle from the outside, this is one example. For example, one of the input and output terminal 13 may be installed for each of the seats 1a, or may be installed for every predetermined number, two or more, of the seats 1a. Note that in the description below, for convenience of explanation, one of the input and output terminal 13 is installed in the vehicle unless otherwise specified.

Alternatively, one of the input and output terminal 13 may be installed near a seat in the front row. In this case, the input and output terminal 13 may be configured to include a large display in order to allow all passengers to view an image. As described above, the number and the installation position of the input and output terminals 13 are not particularly limited.

The in-vehicle sensor 12 is configured with, for example, a camera installed on a ceiling in the vehicle, and acquires sensing data used by the information processing apparatus to determine whether or not a passenger is present in the vehicle. Here, the in-vehicle sensor 12 is configured with one wide-angle camera installed at the center of the ceiling to shoot an entire area of the inside of the vehicle, hut this is one example. For example, the in-vehicle sensor 12 may be configured with a plurality of cameras that together shoot the entire area of the inside of the vehicle. In this case, the in-vehicle sensor 12 may be configured with a plurality of cameras having a normal angle of view.

FIG. 2 is a block diagram illustrating a configuration of the vehicle 1 illustrated in FIG. 1. The vehicle 1 further includes an information processing apparatus 14 and a vehicle control unit 15 in addition to the outside sensor 11 (an example of a first sensor), the in-vehicle sensor 12 (an example of a second sensor), the input and output terminal 13, and the door 16 illustrated in FIG. 1.

The outside sensor 11 is configured with, for example, light detection and ranging (LIDAR), a stereo camera, or a millimeter wave sensor, and regularly acquires, at a predetermined frame rate, sensing data indicating an object in front of the vehicle 1 and sensing data indicating an object on the side of the vehicle 1.

LIDAR is a sensor that uses a laser to emit pulses of light outside a visible spectrum while changing directions, and measures a time period until the pulses return, so as to measure a direction and a distance of an object that exists in the surroundings. The millimeter wave sensor is a sensor that emits a millimeter wave and measures a beat frequency obtained by adding a reflected wave and an original emitted wave, so as to measure a direction and a distance of an object the exists in the surroundings. A stereo camera is, for example, a sensor that measures a distance and a direction of an object that exists in the surroundings based on the parallax of the object included in images shot by a plurality of cameras.

The in-vehicle sensor 12 is configured with, for example, a camera, and acquires an image showing a passenger in the vehicle at a predetermined frame rate.

The information processing apparatus 14 includes a processor 140 and a communication unit 150. The processor 140 is configured with, for example, a CPU, and includes an operation control unit 141, an in-vehicle passenger detection unit 142, and a display information generation unit 143. The operation control unit 141 to the display information generation unit 143 are obtained, for example, as the processor 140 executes a program stored in a memory (not shown).

The operation control unit 141 (an example of the boarding control unit) is responsible for controlling boarding of a person on the vehicle 1. Specifically, the operation control unit 141 manages, for example, a predetermined operation schedule of the vehicle 1 and causes the vehicle 1 to travel according to the operation schedule.

Here, the operation schedule includes, for example, position information (for example, latitude and longitude) of a plurality of bus stops at which a bus is to stop, an arrival time and a departure time at each bus stop, route information showing an optimum route from when a bus departs from a garage until the bus returns to the garage again after passing a bus stop at which the bus is to stop, and the like.

Therefore, for example, the operation control unit 141 collates position information of a current position of the vehicle 1 with position information of a bus stop, and upon detecting that the vehicle 1 has arrived at a certain bus stop, transmits a control command to stop the vehicle 1 and a control command to open the door 16 to the vehicle control unit 15 using the communication unit 150. Note that the operation control unit 141 may acquire, for example, position information detected by a GPS sensor (not shown) as position information of the current position of the vehicle 1.

Further, when a departure time of the bus stop is reached, the operation control unit 141 notifies the in-vehicle passenger detection unit 142 of the fact. Further, when a determination result indicating the presence or absence of a person who is trying to get on the vehicle 1 is input by a passenger, and the determination result is transmitted from the input and output terminal 13, the operation control unit 141 controls opening and closing of the door 16 according to the determination result. The determination result corresponds to an example of input data and operation data. Here, the operation control unit 141 may control opening and closing of the door 16 by transmitting a control command to the vehicle control unit 15 via the communication unit 150. In this manner, it is possible to prevent the vehicle 1 from immediately departing at a departure time when there is a person who is trying to get on the vehicle 1.

When the operation control unit 141 notifies that the departure time is reached, the in-vehicle passenger detection unit 142 (an example of the determination unit) acquires sensing data (an example of the second sensing data) detected by the in-vehicle sensor 12 via the communication unit 150, and uses the sensing data to detect whether or not there is a passenger in the vehicle. Here, since the in-vehicle sensor 12 is configured with a camera, the sensing data detected by the in-vehicle sensor 12 is configured with image data showing a situation in the vehicle. Therefore, the in-vehicle passenger detection unit 142 preferably detects a passenger in the vehicle by applying predetermined image processing to the image data.

Here, as the predetermined image processing, for example, processing of detecting a passenger using a classifier generated by deep learning may be employed, or processing of detecting a passenger by template matching may be employed. Note that in a case of detecting that there is a passenger in the vehicle, the in-vehicle passenger detection unit 142 notifies the display information generation unit 143 of the fact.

When notified by the in-vehicle passenger detection unit 142 that there is a passenger in the vehicle, the display information generation unit 143 (an example of the presentation control unit) acquires sensing data acquired by the outside sensor 11 using the communication unit 150. Then, the display information generation unit 143 generates, by using the acquired sensing data, presentation information for allowing a passenger to input determination result (an example of input data) as to whether or not to allow the vehicle to depart, and transmits the presentation information to the input and output terminal 13 via the communication unit 150. For example, the presentation information may be a presentation image (an example of the operation image) for allowing a passenger to input a determination result (an example of the operation data) as to the presence or absence of a person who is trying to get on the vehicle 1.

The communication unit 150 (an example of the first acquisition unit and the second acquisition unit) is configured with a communication interface for communicably connecting the information processing apparatus 14, the outside sensor 11, the in-vehicle sensor 12, and the input and output terminal 13.

The vehicle control unit 15 is configured with a computer, such as an ECU, a traveling motor for driving the vehicle 1, a brake for braking the vehicle 1, an open and close motor for opening and closing the door 16, and the like, and operates the vehicle 1 according to a variety of control commands transmitted from the information processing apparatus 14. For example, when receiving a control command to close the door 16 from the communication unit 150, the vehicle control unit 15 operates the open and close motor to close the door 16. Further, when receiving a control command for causing the vehicle 1 to depart from the communication unit 150, the vehicle control unit 15 operates the traveling motor to cause the vehicle 1 to depart.

Further, the vehicle control unit 15 receives the sensing data acquired by the outside sensor 11 via the communication unit 150 at a predetermined cycle, and causes the vehicle 1 to be automatically driven using AI technology.

The input and output terminal 13 includes a communication unit 131 and an input and output unit 132. The communication unit 131 is configured with a communication device that communicably connects the input and output terminal 13 to the information processing apparatus 14. In the present disclosure, the communication unit 150 receives the presentation image transmitted from the information processing apparatus 14 and also transmits to the information processing apparatus 14 a determination result of a passenger with respect to the presentation image acquired by the input and output unit 132. The input and output unit 132 includes, for example, an output device such as a display, an input device such as a touch panel, a processor that controls the output device and the input device, and the like.

In the present disclosure, the input and output unit 132 generates a presentation image based on the image data of the presentation image transmitted from the information processing apparatus 14 and displays the presentation image on a display, and also receives input by a passenger for the presentation image.

Figure 3:
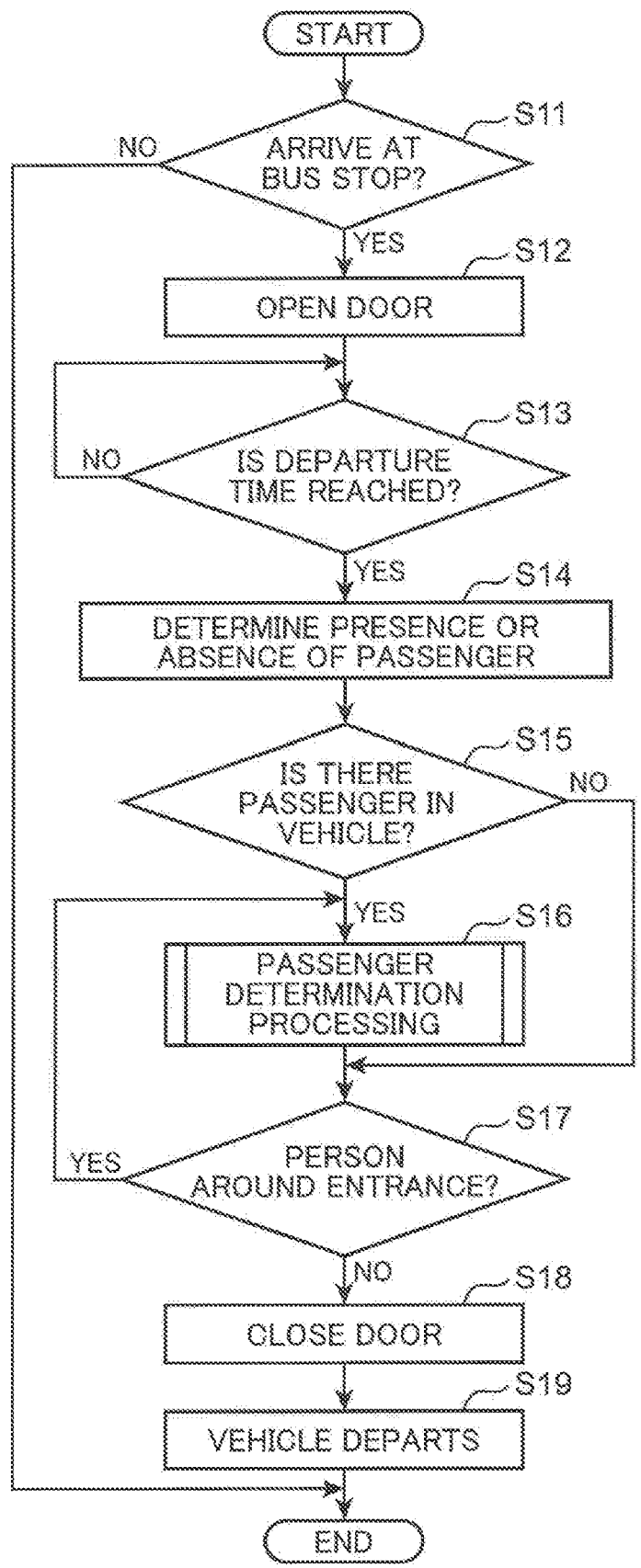
FIG. 3 is a flowchart illustrating an example of processing of the information processing apparatus illustrated in FIG. 1.

Next, processing of the information processing apparatus 14 will be described. FIG. 3 is a flowchart illustrating an example of processing of the information processing apparatus 14 illustrated in FIG. 1. In S11, the operation control unit 141 determines whether or not the vehicle 1 has arrived at a bus stop. Here, the operation control unit 141 determines whether or not the vehicle 1 has arrived at the bus stop by collating position information of a current position of the vehicle with position information of a bus stop included in the operation schedule. Note that, when the current position of the vehicle 1 is located at a predetermined distance or less with respect to a bus stop, the operation control unit 141 preferably transmits a control command for braking the vehicle 1 to accurately stop the vehicle 1 at the bus stop to the control unit 15 via the communication unit 150.

If the vehicle 1 is determined to have arrived at a bus stop (YES in S11), the processing proceeds to S12. If the vehicle 1 is determined not to have arrived at a bus stop (NO in S11), the processing ends.

In S12, the operation control unit 141 causes the vehicle control unit 15 to open the door 16 by transmitting a control command to open the door 16 to the vehicle control unit 15 via the communication unit 150. In this manner, the vehicle 1 stops at the bus stop with the door 16 opened.

In S13, the operation control unit 141 determines whether or not the current time has reached a departure time corresponding to the bus stop. Here, the operation control unit 141 performs the determination of S13 by collating a clock (not shown) included in the information processing apparatus 14 with the departure time of the bus stop included in the operation schedule. If the current time is determined to have reached the departure time (YES in S13), the processing proceeds to S14. If the current time is determined not to have reached the departure time (NO in S13), the processing returns to S13.

In S14, the in-vehicle passenger detection unit 142 determines the presence or absence of a passenger in the vehicle using the sensing data acquired by the in-vehicle sensor 12. In a case where it is determined that there is a passenger in the vehicle (YES in S15), the processing proceeds to S16. In a case where it is determined that there is no passenger in the vehicle (NO in S15), no judging subject for the passenger determination processing exists in the vehicle. Accordingly, the processing proceeds to S17 without performing the passenger determination processing. In this way, it is possible to eliminate the occurrence of useless processing when there is no judging subject.

In S16, the passenger determination processing is executed. The passenger determination processing is processing of causing a passenger in the vehicle to determine the presence or absence of a person who is trying to get on the vehicle 1 and input a determination result, and will be described in detail with reference to FIG. 4.

In S17, the operation control unit 141 determines whether or not there is a person around an entrance by using the sensing data acquired by the outside sensor 11. Here, for example, the operation control unit 141 extracts a person by inputting sensing data into the above-described classifier. In a ease where the person is located within a predetermined distance from the entrance, the operation control unit 141 determines that there is a person around the entrance. In a case where there is no person within a predetermined distance from the entrance, the operation control unit 141 preferably determines that there is no person around the entrance. Here, the entrance refers to a part where the door 16 through which a person gets on the vehicle is opened and closed. Further, as the predetermined distance, for example, distances, such as 1 m, 2 m, and 5 m, from the entrance can be employed. In this manner, the door 16 of the vehicle 1 can be prevented from being closed despite the presence of a person in the middle of getting on the vehicle 1.

If there is no person in the vicinity of the entrance (YES in S17), the processing proceeds to S18. If there is a person around the entrance (NO in S17), the processing returns to S16, and the passenger determination processing is executed again.

In S18, the operation control unit 141 transmits a control command for closing the door 16 to the vehicle control unit 15 using the communication unit 150, and causes the vehicle control unit 15 to operate the open and close motor to close the door 16.

In S19, the operation control unit 141 transmits a control command for causing the vehicle 1 to travel to the vehicle control unit 15 using the communication unit 150, and causes the vehicle control unit 15 to operate the traveling motor to cause the vehicle 1 to depart from a bus stop.

Figure 4:
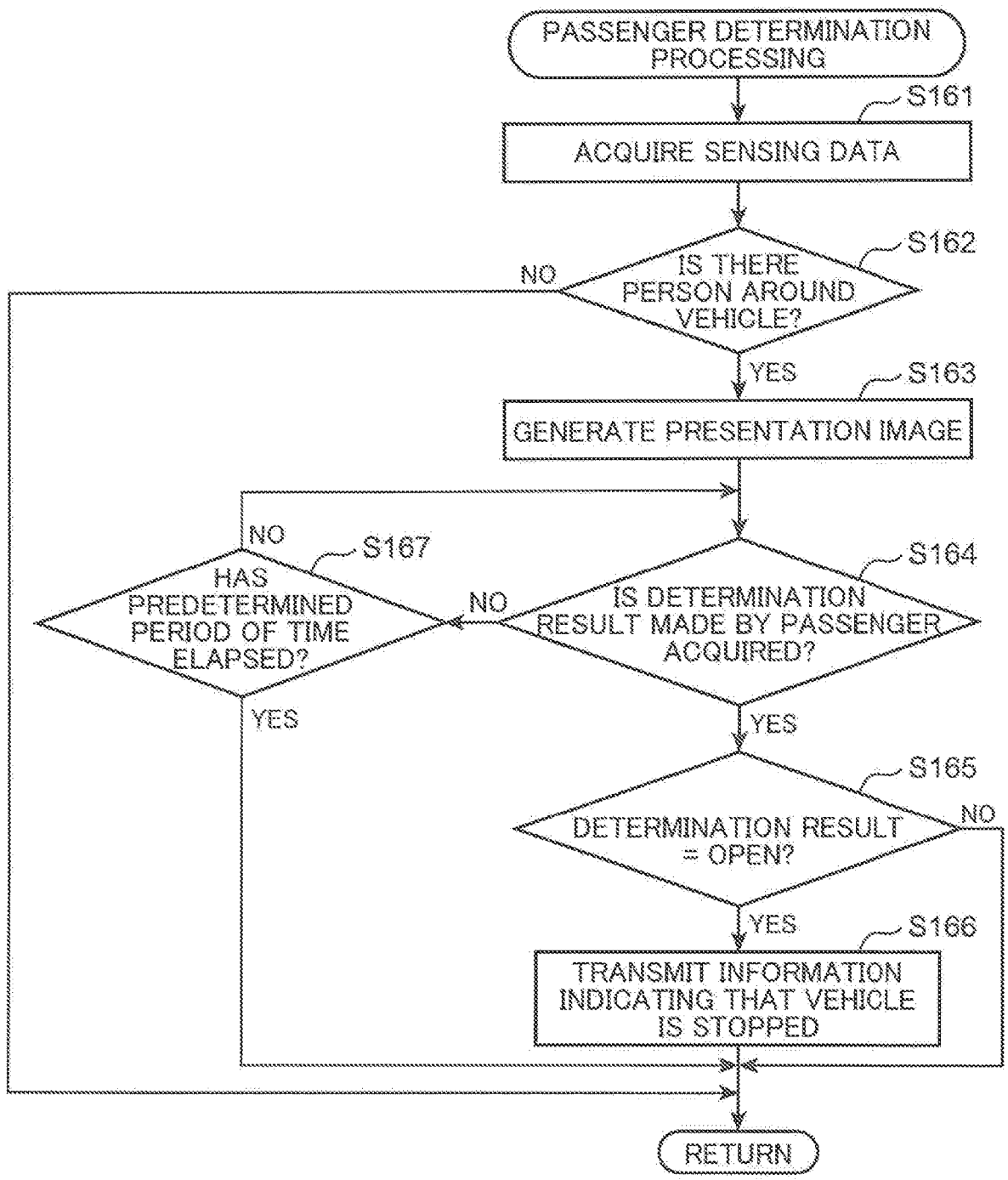
FIG. 4 is a flowchart illustrating details of passenger determination processing illustrated in FIG. 3.

FIG. 4 is a flowchart illustrating details of the passenger determination processing illustrated in 3. In S161, the display information generation unit 143 acquires the sensing data acquired by the outside sensor 11 via the communication unit 150. In S162, the display information generation unit 143 determines whether or not there is a person around the vehicle 1 by using the sensing data acquired by the outside sensor 11.

Here, the display information generation unit 143 preferably determines whether or not there is a person around the vehicle 1 by using a classifier that classifies various objects included in the sensing data acquired by the outside sensor 11 into a plurality of classes.

The classifier is, for example, data created in advance by machine learning, such as deep learning. As a plurality of the classes, for example, a class corresponding to an object assumed to be located around the vehicle 1, such as a person class indicating a person, a bicycle class indicating a bicycle, and an automobile class indicating an automobile, is employed. Here, although the presence or absence of a person around the vehicle 1 is detected using a classifier, the present disclosure is not limited to this configuration. The display information generation unit 143 may use a publicly-known image recognition method, such as template matching, to detect the presence or absence of a person around the vehicle 1.

Around the vehicle 1 refers to, for example, a region within a predetermined distance (for example, 40 m) from the center of gravity of the vehicle 1. Note that, this 40 m is an example, and other distances, such as 10 m, 20 m, and 30 m, may be employed. In this manner, the display information generation unit 143 can detect a person around the vehicle 1, such as a person at a bus stop and a person running to the vehicle 1.

Specifically, the display information generation unit 143 inputs the sensing data acquired by the outside sensors 111 and 112 into the classifier. If there is an object positioned within a predetermined distance from the vehicle 1 among objects output as the person class, it is preferably determined that there is a person around the vehicle 1. On the other hand, in a case where there is no object positioned within a predetermined distance from the vehicle 1 or there is no object output as the person class within the predetermined distance among the objects output as the person class, the display information generation unit 143 preferably determines that there is no person around the vehicle 1.

In a case where it is determined that there is a person around vehicle 1 (YES in S162), the processing proceeds to S163, and in a case where it is determined that there is no person around the vehicle 1 (NO in S162), the processing returns to FIG. 3.

In S163, the display information generation unit 143 generates a presentation image including an image showing a person who is around the vehicle 1 and an operation image for causing a passenger in the vehicle to input a determination result as to whether or not the person is trying to get on the vehicle 1, and transmits the presentation image to the input and output terminal 13 using the communication unit 150. In this manner, the input and output unit 132 of the input and output terminal 13 displays the presentation image.

Figure 5:
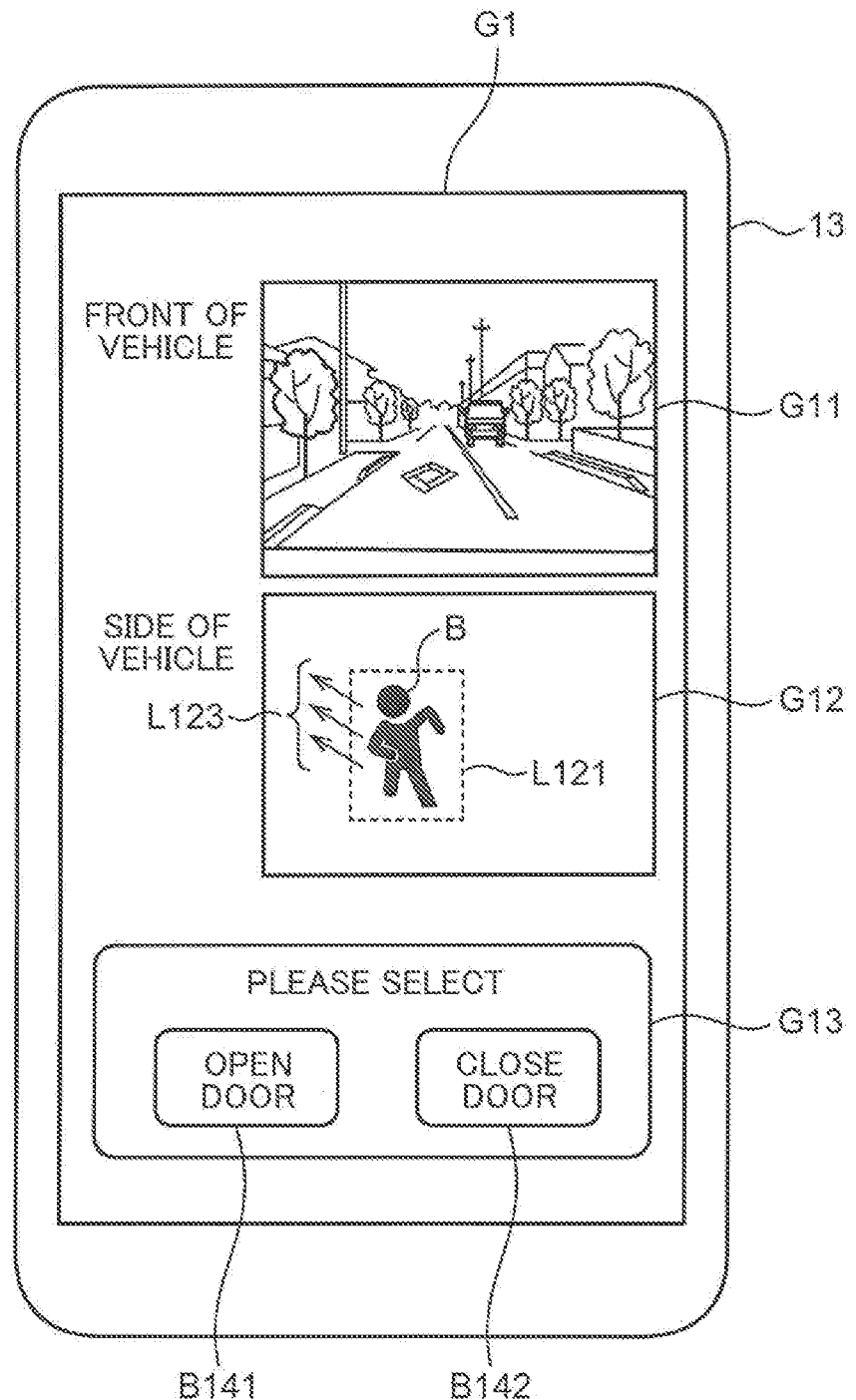
FIG. 5 is a diagram illustrating an example of a presentation image displayed on an input and output terminal.

FIG. 5 is a diagram illustrating an example of a presentation image G1 displayed on the input and output terminal 13. The presentation image G1 includes an image G11 showing a situation in front of the vehicle 1, an image G12 for showing a situation on the side of the vehicle, and an operation image G13 into which a determination result of a passenger is input.

The image G11 is an image generated based on the sensing data acquired by the outside sensor 111 installed on the front of the vehicle 1. The image G12 is an image generated based on the sensing data acquired by the outside sensor 112 installed on the side of the vehicle 1. For example, in a case where the outside sensor 111 and the outside sensor 112 are configured with LIDAR or a millimeter wave sensor, an image obtained by applying coloring processing to the sensing data may be employed as the image G11 and the image G12. Further, in a case where the outside sensor 111 and the outside sensor 112 are configured with a stereo camera, image data acquired by any one of cameras constituting the stereo camera is preferably displayed as the image G11 and the image G12.

The image G11 and the image G12 are composed of moving images, in which the sensing data acquired by the outside sensor 11 is displayed by being switched at a predetermined frame rate. In this example, since there is a person around the vehicle 1, the image G12 includes the person B who is trying to get on the vehicle 1. Further, in the image G12, an emphasis image L121 for highlighting the person B is superimposed on the image G12 so as to surround the person B. In this example, a square image surrounding the person B with a dotted line is employed as the emphasis image L121. However, this is an example, and for example, an annotation mark displayed in the vicinity of the person B may be employed as the emphasis image L121. Further, the shape of the emphasis image L121 is not limited to a square, and may be a circle or an ellipse, or a solid line may be employed.

Further, in the image G12, a motion vector image L123 indicating a direction in which the person B moves may be displayed instead of or in addition to the emphasis image L121. In this case, the display information generation unit 143 preferably calculates a motion vector by calculating a difference between frames at coordinates indicating the person B extracted from the sensing data acquired by the outside sensor 112 to generate the motion vector image L123.

Further, in the image G12, an image obtained by capturing the person B from the front is displayed. However, this is an example, and a bird's-eye view image that shows a situation around the vehicle 1 when viewed from above the vehicle 1 may be employed. In this case, a camera is provided as the outside sensor 11 on each of the front, left, right, and rear sides of the vehicle 1. Then, the display information generation unit 143 preferably generates a bird's-eye view image by using the image data captured by these cameras and employs the image as the image G12. A map image around the vehicle 1 may be mapped to this bird's-eye view image.

The operation image G13 includes an open button B141 described as "open door" that is selected by a passenger to keep the door 16 in an open state and a close button B 142 described as "close door" that is selected by a passenger to switch the door 16 from an open state to a closed state.

The open button B141 is a button that is selected when a passenger looking at the images G11 and G12 determines that there is a person who is trying to get on the vehicle 1. The close button B142 is a button that is selected when a passenger looking at the images 011 and 012 determines that there is no person who is trying to get on the vehicle 1.

Assume that the image G12 shows that the person B is running toward the vehicle 1, and a passenger in the vehicle 1 determines that the passenger B is trying to get on the vehicle 1 from a situation around the vehicle 1 that the passenger confirms based on the image G12 and by the visual observation. In this case, the passenger inputs operation to select the open button B141. Then, the input and output terminal 13 transmits an instruction to select the open button B141 to the information processing apparatus 14 as a determination result. That is, the instruction to select the open button B141 shows the determination result when the passenger determines that there is a person who is trying to get on the vehicle 1.

On the other hand, assume that, although a person is included in the image G11 and the image G12, a passenger in the vehicle determines that the person does not advance toward the vehicle 1 and is not likely to get on the vehicle 1 based on the image G11, the image G12, and a situation around the vehicle 1 confirmed by visual observation. In this case, the passenger inputs operation to select the close button B142. Then, the input and output terminal 13 transmits an instruction to select the close button B142 to the information processing apparatus 14 as a determination result. That is, the instruction to select the close button B142 shows the determination result when the passenger determines that there is no person who is trying to get on the vehicle 1.

Reference will be made on FIG. 4 again. In S164, the display information generation unit 143 acquires, via the communication unit 150, the determination result that the passenger inputs with respect to the presentation image G1 transmitted from the input and output terminal 13. If the determination result is an instruction of selecting the open button B141 (YES in S165), the processing proceeds to S166. If the determination result is an instruction of selecting the close button B142 (NO in S165), the processing returns to FIG. 3.

In S166, the display information generation unit 143 transmits, to the input and output terminal 13 via the communication unit 150, information indicating that the vehicle is stopped since a person has not completed getting on the vehicle 1. The input and output terminal 13 receiving the information, displays a message indicating the information on the input and output unit 132. In this manner, a passenger can be informed of the reason why the vehicle 1 does not depart.

On the other hand, in a case where the display information generation unit 143 does not acquire a determination result made by a passenger in S164 (NO in S164), the processing proceeds to S167. In S167, the display information generation unit 143 determines whether or not a predetermined period of time has elapsed since a departure time. If the predetermined period of time has not elapsed (NO in S167), the processing returns to S164 to wait until a determination result is input by the passenger. On the other hand, if the predetermined period of time has passed since the departure time (YES in S167), the processing returns to FIG. 3. That is, in the present flow, if there is no input of a determination result by a passenger within a predetermined period of time after the departure time, the processing is timed out to avoid a situation where the vehicle 1 does not depart forever.

As described above, according to the present embodiment, a presentation image G1 including the image G11 and the image G12 showing a person around the vehicle 1 is displayed on the input and output terminal 13. Then, when the determination result that there is a person who is trying to get on the vehicle 1 is input by a passenger in the vehicle, the door 16 is closed and the vehicle 1 departs after the person gets on the vehicle 1. Therefore, in the present embodiment, determination made by a passenger in the vehicle can be used for the determination processing as to the presence or absence of a person trying to get on the vehicle 1, and leaving behind of a person trying to get on the vehicle 1 can be suppressed or safety in getting on the vehicle can be improved.

(Variations of the Presentation Image)

Figure 6:
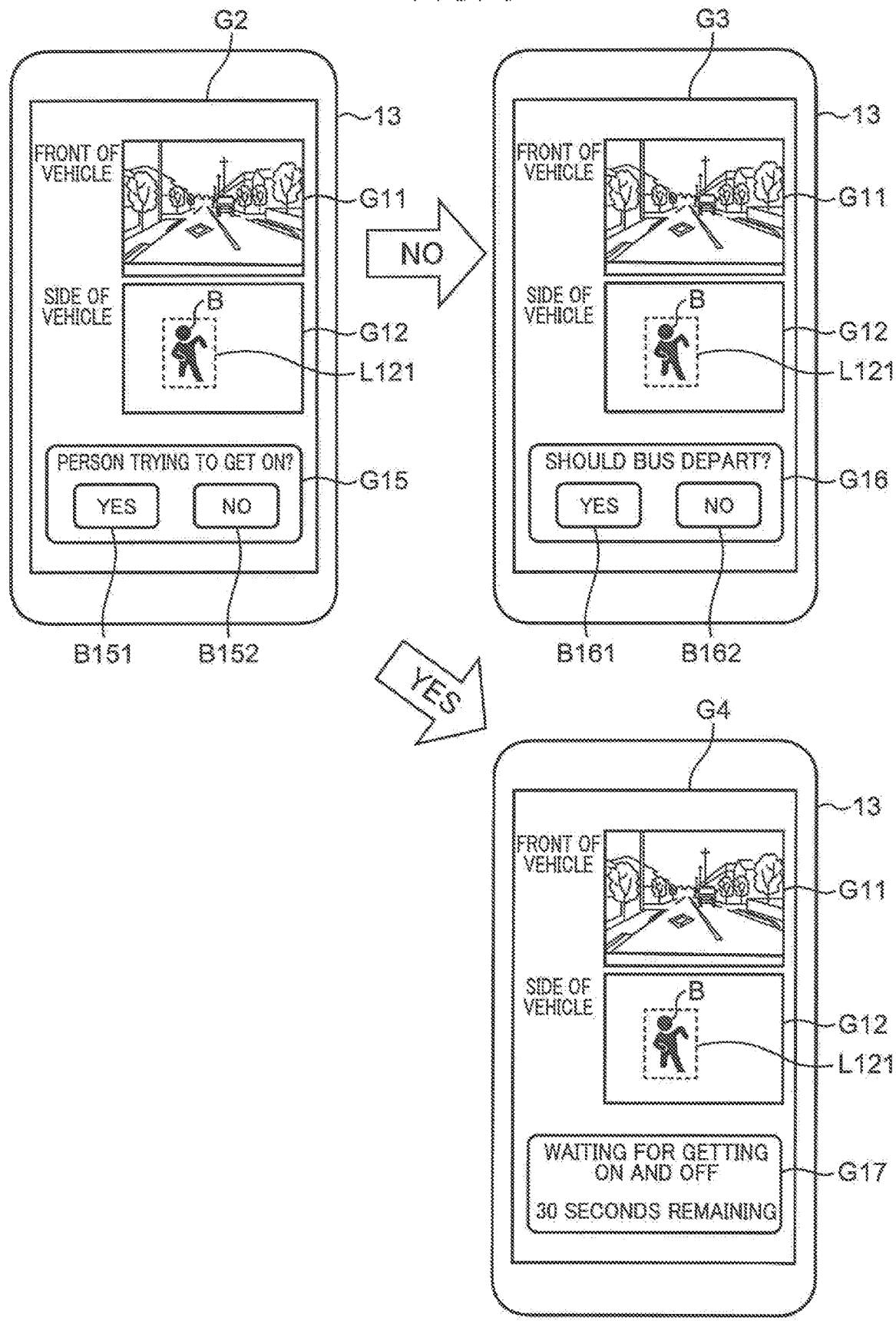
FIG. 6 is a diagram illustrating the presentation image according to another example of the first embodiment of the present disclosure.

Next, variations of the presented image will be described. FIG. 6 is a diagram illustrating the presentation image according to another example of the first embodiment of the present disclosure. The presentation image G2 is an image displayed on the input and output terminal 13 in S163 of FIG. 4. Note that the same constituents as those in the presentation image G1 illustrated in FIG. 5 are attached with the same reference numerals in FIG. 6. The same applies to the presentation images in embodiments described later.

A difference between the presentation image G2 and the presentation image G1 is that an operation image G15 is displayed instead of the operation image G13. The operation image G13 is an image that allows a passenger in the vehicle to select whether to open or close the door 16, whereas the operation image G15 is an image that allows a passenger in the vehicle to select whether there is a person who is trying to get on the vehicle 1. Note that the operation image may be an image for inputting whether or not a person around the vehicle 1 is likely to get on the vehicle 1.

The operation image G15 includes a YES button B151 that is selected in a case where a passenger in the vehicle determines that there is a person who is trying to get on the vehicle 1 and a NO button B152 that is selected in a case where a passenger in the vehicle determines that there is no person who is trying to get on the vehicle 1.

As described above, since the presentation image G2 includes the operation image G15, indirect and physical boarding control can be performed by operation of a passenger in the vehicle. As a result, it is psychologically difficult for the passenger in the vehicle to make a determination not to allow a person to get on the vehicle, and it is possible to make it easier for a person who is trying to get on the vehicle to get on than in the case where the opening and closing operation of the door 16 is performed. Therefore, it is possible to suppress leaving behind of a person who is trying to get on the vehicle.

In the operation image G15, when the NO button B152 is selected by a passenger in the vehicle and an instruction for the selection is transmitted from the input and output terminal 13, the display information generation unit 143 causes the input and output terminal 13 to display the presentation image G3. The presentation image G3 is different from the presentation image G2 in the content of an operation image G16. The operation image G16 is an image that causes a passenger in the vehicle to input a determination result as to whether or not to cause the vehicle 1 to depart. The operation image G16 includes a YES button B161 selected when a passenger in the vehicle determines that the vehicle may depart, and a NO button B162 selected when a passenger in the vehicle determines that the vehicle does not depart.

A passenger in the vehicle comprehensively determines a situation around the vehicle 1 indicated by the image G11 and the image G12, a situation of the vehicle 1 actually visually observed through a window, and the like. When determining that there is no person who is trying to get on the vehicle 1 remaining around the vehicle 1, the passenger in the vehicle selects the YES button B161. When an instruction to select the YES button B161 is transmitted from the input and output terminal 13, the operation control unit 141 transmits a control command for closing the door 16 and a control command for causing the vehicle 1 to travel to the vehicle control unit 15, so as to cause the vehicle control unit 15 to allow the vehicle 1 to travel after closing the door 16.

On the other hand, when determining that a person who is trying to get on the vehicle 1 remains around the vehicle 1, a passenger in the vehicle selects the NO button B162. When an instruction to select the NO button B162 is transmitted from the input and output terminal 13, the operation control unit 141 does not transmit a control command for closing the door 16 and a control command for causing the vehicle 1 to travel to the vehicle control unit 15. In this manner, it is possible to avoid a situation where the door 16 is closed and the vehicle 1 starts traveling even though there is a person who has not completed getting on the vehicle 1, and the safety of the person can be ensured.

A presentation image G4 is an image that the display information generation unit 143 causes the input and output terminal 13 to display, when the YES button B151 is selected by a passenger in the vehicle on the operation image G15 of the presentation image G2 and an instruction for the selection is transmitted from the input and output terminal 13.

The presentation image G4 is different from the presentation image G2 in that a notification section G17 is displayed instead of the operation image G15. The notification section G17 is an image for notifying a passenger in the vehicle of an extension of a stopping time period of the vehicle 1 at a bus stop. Here, a message "waiting for getting on and off" is displayed, and a remaining period of time until departure of the vehicle, such as "30 seconds remaining", is displayed. In this manner, a passenger in the vehicle can recognize that the vehicle 1 will not depart because there still remains a person getting on and off the vehicle, and can know how long the vehicle 1 will wait until departure.

Here, when the YES button B151 in the operation image G15 is selected on the presentation image G2, the operation control unit 141 extends the stopping time period of the vehicle 1 for a predetermined time period (for example, 30 seconds, 1 minute, and so on) determined in advance. Then, when a predetermined period of time has elapsed, the display information generation unit 143 causes the input and output terminal 13 to display the presentation image G3. Then, when the YES button B161 in the presentation image G3 is selected by a passenger in the vehicle, the operation control unit 141 preferably causes the vehicle 1 to depart after closing the door 16. On the other hand, when the NO button B162 in the presentation image G3 is selected by a passenger in the vehicle, the operation control unit 141 preferably keeps the vehicle 1 to be stopped with the door 16 opened. Note that, if neither the YES button B161 nor the NO button B162 is selected until a predetermined period of time elapses after the presentation image G3 is displayed, the operation control unit 141 preferably closes the door 16 and causes the vehicle 1 to depart after confirming that no person who is trying to get on the vehicle 1 remains around the vehicle 1.

Variation of the First Embodiment

Hereinafter, variations of the first embodiment will be described. Note that, these variations are applicable also to embodiments described later.

(1) Although the number of the input and output terminals 13 is one in the above description, the present disclosure is not limited to this, and may be plural. In this case, determination results made by a plurality of passengers are assumed to be different in such a manner as, for example, while a certain passenger inputs a determination result that there is no person trying to get on the vehicle 1, another passenger inputs a determination result that there is a person trying to get on the vehicle 1. In this case, in a ease where at least one passenger inputs a determination result that there is a person trying to get on the vehicle 1, the operation control unit 141 preferably employs the determination result and keeps the vehicle 1 to be stopped. This ensures safety.

Note that, as an aspect of providing a plurality of the input and output terminals 13, an aspect, in which, for example, the image G11 and the image G12 of the presentation image G1 illustrated in FIG. 5 are displayed on a large-screen display provided in the vicinity of the front in the vehicle, and only the operation image G13 is displayed on the input and output terminal 13 provided at each of the seats 1a, can be employed.

(2) In the above description, the passenger determination processing is not executed in a case where there is no passenger in a vehicle in S15 in FIG. 3 (NO in S15). However, the present disclosure is not limited to this, and determination may be made by an outsider. Here, the outsider is, for example, a monitor who remotely monitors and controls the vehicle 1. In this case, a monitoring server for monitoring and controlling the vehicle 1 is separately provided, and the monitoring server is communicably connected to the vehicle 1. Further, the monitoring server is also connected to a terminal provided with a display and an input device. Presentation information generated based on the sensing data acquired by the outside sensor 11 is displayed on a display of the terminal. When the monitoring server receives a notification that there is no passenger in the vehicle from the vehicle 1, the monitoring server notifies the monitor of the fact by sounding an alarm or the like.

The monitor checks the presentation information displayed on the display of the terminal, and when determining that there is no person who is trying to get on the vehicle 1, inputs the determination result via an input device of the terminal. The input determination result is transmitted to the monitoring server, and the monitoring server notifies the vehicle 1 of a departure instruction via communication and causes the vehicle 1 to depart. On the other hand, when determining that there is a person who is trying to get on the vehicle 1, the monitor inputs the determination result via the input device of the terminal. The input determination result is transmitted to the monitoring server, and the monitoring server preferably notifies the vehicle 1 of a waiting instruction via communication and keeps the vehicle 1 to be stopped. In this manner, even in a case where there is no passenger in the vehicle, it is possible to allow a person trying to get on the vehicle 1 to get on safely without leaving behind the person.

(3) In the above description, the presentation image is described as being displayed on the input and output terminal 13. However, the present disclosure is not limited to this. For example, a technique, such as projection mapping, may be applied, so that the presentation image is displayed on a window of the vehicle 1. In this case, a projector is preferably provided on the input and output terminal 13 or an appropriate place in the vehicle, so that a presentation image is displayed on a window.

(4) S166 of FIG. 4 describes that a message indicating that the vehicle is stopped is displayed on a screen of the input and output terminal 13 because a person has not completed getting on the vehicle. However, the present disclosure is not limited to this, and a voice message indicating the information may be announced in the vehicle.

(5) In the above description, the operation control unit 141 controls the opening and closing of the door 16 according to a determination result of a passenger. However, the present disclosure is not limited to this. For example, if a home fence including an openable and closable door is provided at a bus stop, the operation control unit 141 may control opening and closing of the door provided in this home fence in accordance with a determination result. In this case, the vehicle 1 and a processor of the home fence are preferably communicably connected. Then, the information processing apparatus 14 of the vehicle 1 and a processor of the home fence may transmit and receive various pieces of data via communication.

(6) In the above description, the presentation information is described as information based on sensing data. However, information based on a past boarding control result at a stop position or sensing data at the time of boarding control may also be included. For example, the presentation information may include information indicating that it is a bus stop position at which waiting control is executed for boarding in the past, an image when the waiting control is executed, or an image processing result with respect to the image.

Second Embodiment

In a second embodiment, an incentive (benefit) is provided to a passenger who has input a determination result as to whether or not there is a person who is trying to get on the vehicle 1. Here, as an incentive, for example, points given to point cards, such as a credit card, a mileage card, a boarding card, and a cash card, are employed.

Figure 7:
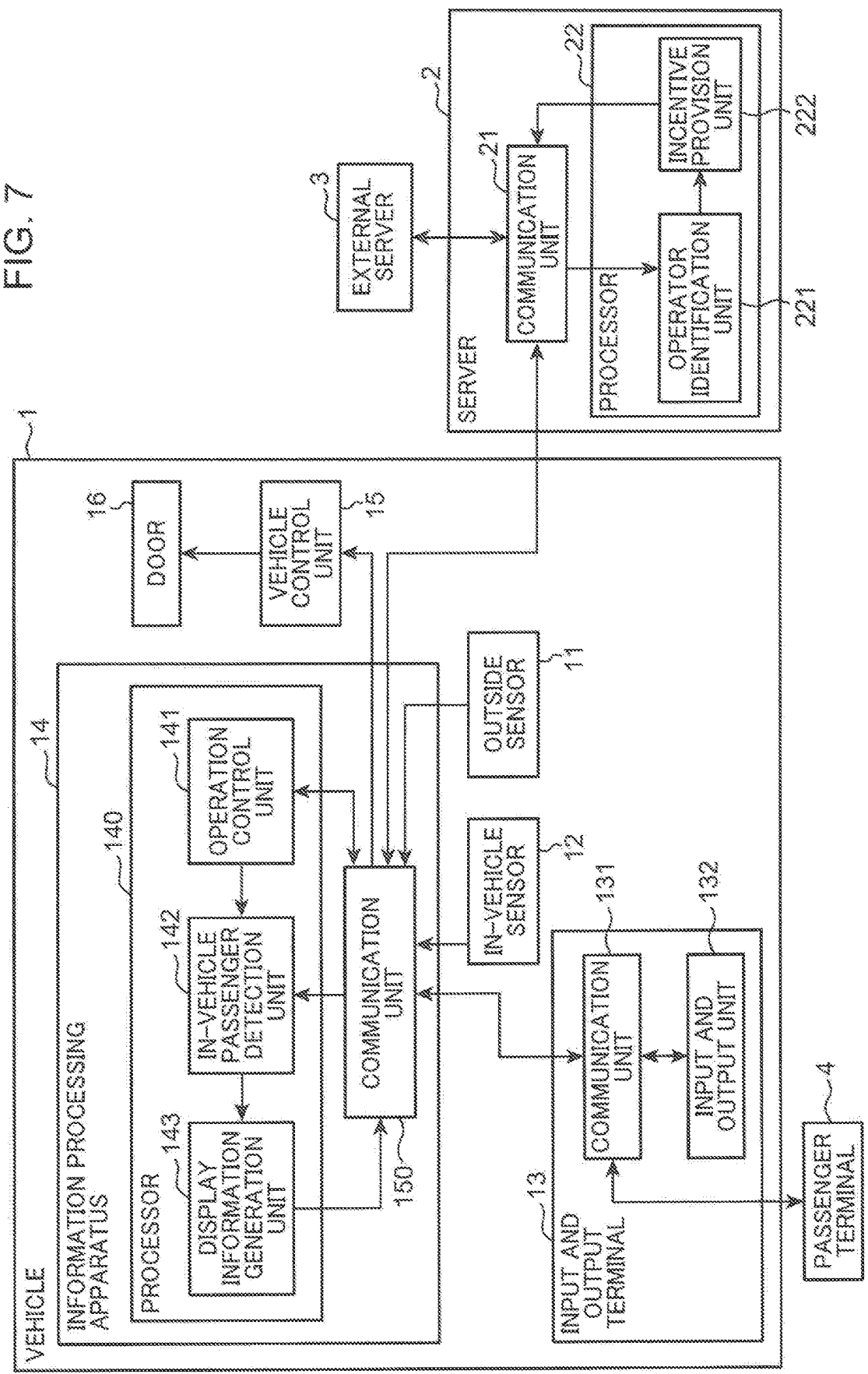
FIG. 7 is a block diagram illustrating a configuration of a vehicle management system to which the information processing apparatus according to a second embodiment is applied.

FIG. 7 is a block diagram illustrating a configuration of a vehicle management system to which the information processing apparatus 14 according to the second embodiment is applied. Note that, in the present embodiment, the same constituents as those of the first embodiment will be denoted by the same reference numerals and will be omitted from description. The same applies to embodiments described later.

The vehicle management system further includes a server 2, an external server 3, and a passenger terminal 4 in addition to the vehicle 1. The server 2 and the passenger terminal 4 are communicably connected to the vehicle 1, and the external server 3 is communicably connected to the server 2.

The passenger terminal 4 (an example of the communication terminal) is configured with, for example, portable terminals, such as a smartphone and a tablet terminal, and is carried by a passenger in the vehicle. The passenger terminal 4 is communicably connected to the input and output terminal 13 via a predetermined communication path. Here, as the predetermined communication path, proximity radio communication, such as NFC and Bluetooth (registered trademark), can be employed. However, this is an example, and a wireless LAN may be employed as the predetermined communication path.

The server 2 is configured with one or a plurality of computers, and is communicably connected to the information processing apparatus 14 via a wide area communication network, such as an Internet communication network and a mobile telephone communication network. The server 2 includes a communication unit 21 and a processor 22. The communication unit 21 is configured with a communication circuit that connects the server 2 to a wide area communication network.

The processor 22 includes an operator identification unit 221 (an example of the identifying unit) and an incentive provision unit 222. The operator identification unit 221 identifies a passenger in the vehicle that inputs a determination result as to whether or not there is a person who is trying to get on the vehicle 1.

Here, prior to receiving of input of a determination result by a passenger in the vehicle, the passenger terminal 4 transmits, to the input and output terminal 13, an identification request including a user identifier of a passenger who holds the passenger terminal 4. Here, the identification request is a request made by a passenger requesting the server 2 to identify the passenger himself or herself.

The input and output terminal 13 transmits the identification request to the server 2 via the information processing apparatus 14. The operator identification unit 221 identifies the user identifier included in the identification request as a passenger. When identifying a passenger, the operator identification unit 221 transmits, to the information processing apparatus 14, an input permission for permitting input of a determination result by the identified passenger.

When the information processing apparatus 14 receives the input permission, the display information generation unit 143 causes the input and output unit 132 to display a presentation image including an operation image for causing a passenger to input a determination result.

The incentive provision unit 222 provides an incentive to the passenger identified by the operator identification unit 221. Here, the incentive provision unit 222 transmits, to the external server 3 via the communication unit 21, a request notification for providing a predetermined point as an incentive to the identified passenger. The request notification includes a point to be provided and the user identifier.

The external server 3 is, for example, a server managed by a management company of a point card subject to provision of an incentive. The external server 3 includes a customer database that stores user identifiers of one or more customers who carry a point card and points owned by each customer, which are associated with each other. Therefore, when receiving a request notification from the server 2, the external server 3 provides a point to the customer by adding a point included in the request notification to a point of the passenger stored in the customer database by using the user identifier included in the request notification as a key.

Figure 8:
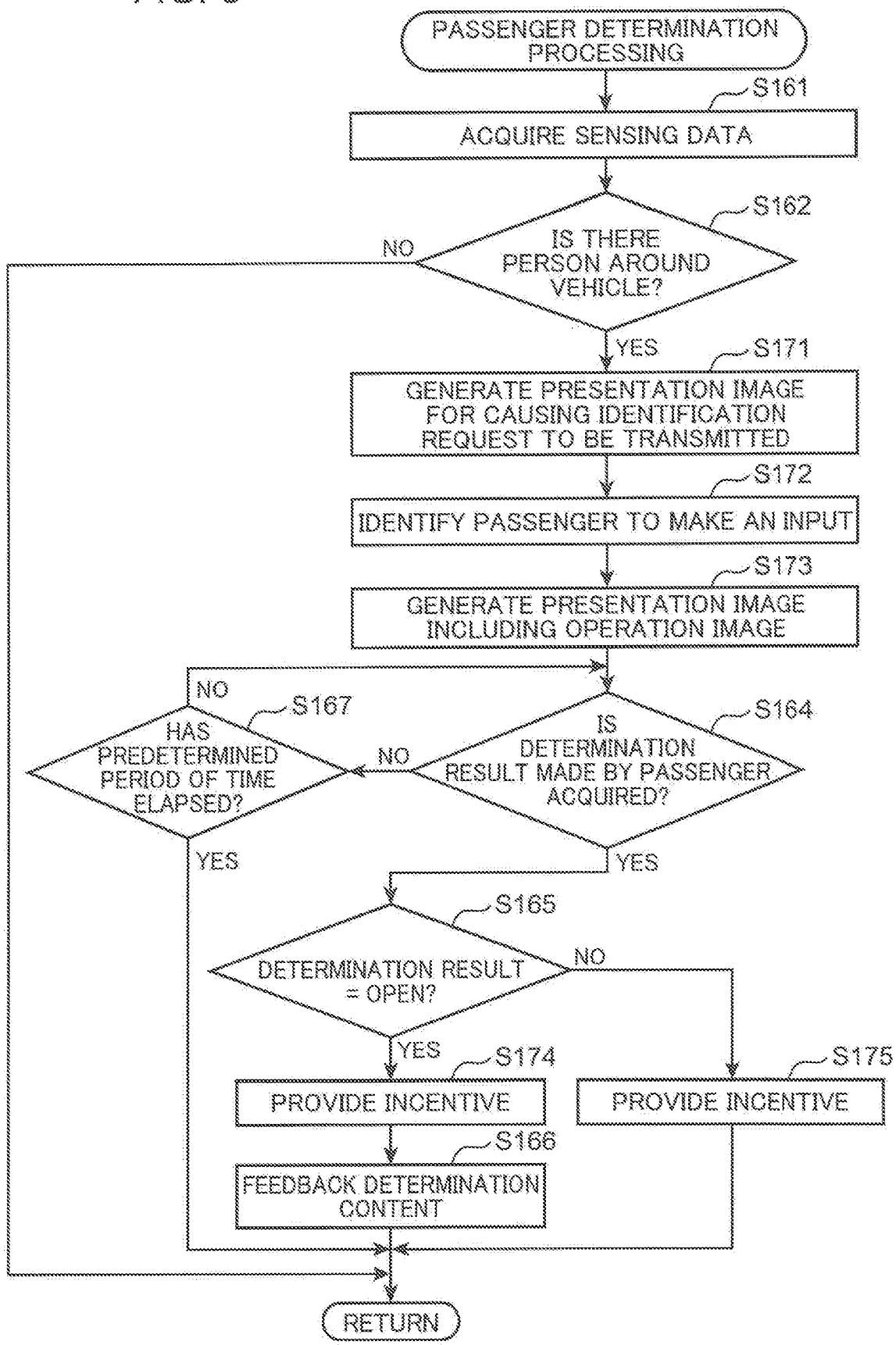
FIG. 8 is a flowchart illustrating the passenger determination processing according to the second embodiment.

FIG. 8 is a flowchart illustrating the passenger determination processing according to the second embodiment. In FIG. 8, the same processing as that of FIG. 4 is attached with the same reference numeral and omitted from description.

Figure 9:
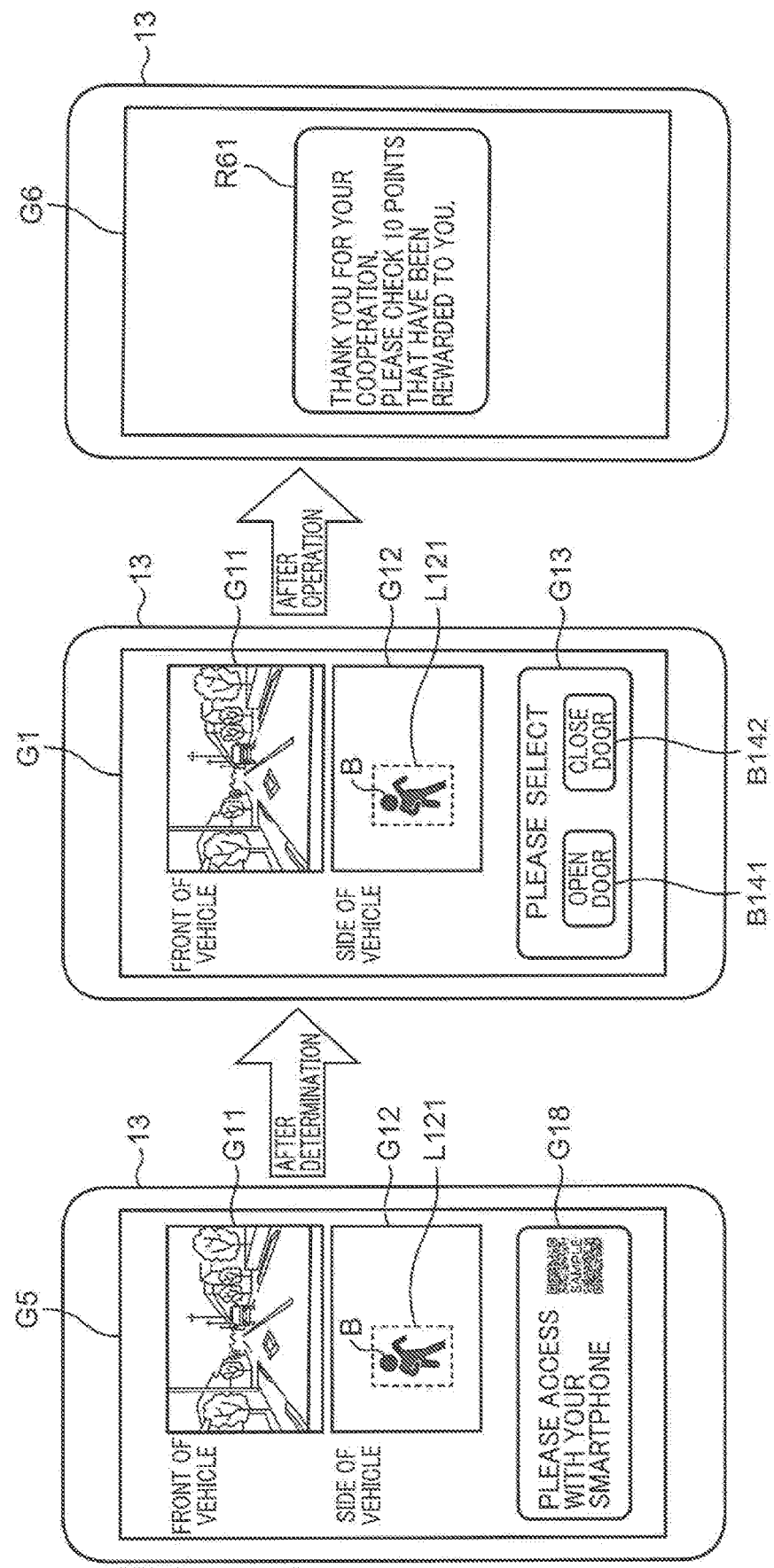
FIG. 9 is a diagram illustrating an example of the presentation image displayed on the input and output terminal in the second embodiment.

In S171 following S162, the display information generation unit 143 generates a presentation image for causing the passenger to transmit the identification request, and causes the input and output terminal 13 to display the presentation image. In this case, for example, a presentation image G5 described later with reference to FIG. 9 is displayed. An identification request is transmitted from the passenger terminal 4 using this presentation image G5.

In S172, the operator identification unit 221 of the server 2 acquires the identification request transmitted in S171 via the input and output terminal 13 and the information processing apparatus 14, and uses the user identifier included in the acquired identification request to identify the passenger. Note that, when the passenger is identified, the operator identification unit 221 transmits information showing that the passenger has been identified to the information processing apparatus 14.

In S173, when the information showing that the passenger has been identified is transmitted from server 2, the display information generation unit 143 generates a presentation image including an operation image that causes the passenger to input a determination result, and the presentation image is displayed on the input and output terminal 13. In this case, for example, the presentation image G1 described later with reference to FIG. 9 is displayed. The passenger inputs a determination, result by using the presentation image G1, in a similar manner as the first embodiment, and the processing proceeds to S164.

In S174 following YES in S165, the incentive provision unit 222 provides an incentive to the passenger identified in S172, and the processing proceeds to S166. Further, in S175 following NO of S165, the incentive provision unit 222 provides an incentive to the passenger identified in S172 because the passenger inputs a determination result of closing, and the processing is returned to FIG. 3.

FIG. 9 is a diagram illustrating an example of the presentation image displayed on the input and output terminal 13 in the second embodiment. The presentation image G5 is an image displayed on the input and output terminal 13 in S171 of FIG. 8. A difference between the presentation image G5 and the presentation image G1 is that a display section G18 of a QR code (registered trademark) is displayed instead of the operation image G13. In the display section G18, a QR code for a passenger to access the server 2 using the passenger terminal 4 is displayed. Prior to input of a determination result, a passenger causes the passenger terminal 4 to read the QR code. Then, the passenger terminal 4 transmits an identification request requesting the server 2 to identify the passenger to the server 2 via the input and output terminal 13 and the information processing apparatus 14. Then, when the operator identification unit 221 of the server 2 identifies the passenger and a notification showing that the passenger has been identified is transmitted to the information processing apparatus 14, the display information generation unit 143 displays the presentation image G1 on the input and output terminal 13. The presentation image G1 is the same as the presentation image G1 illustrated in FIG. 5.

When the passenger selects the open button B141 or the close button B142 using the presentation image G1, the input and output terminal 13 transmits a selection instruction for either one of the buttons to the information processing apparatus 14 as a determination result of the passenger. The information processing apparatus 14 transmits to the server 2 a notification of completion of input of the determination result. When the server 2 receives the completion notification, the incentive provision unit 222 transmits to the external server 3 a request notification for providing a point, and also transmits, to the information processing apparatus 14, a provision notification indicating that the point has been provided. When the information processing apparatus 14 receives the provision notification, the display information generation unit 143 generates a presentation image G6 for notifying the passenger of provision of a point, and causes the input and output terminal 13 to display the presentation image G6.

The presentation image G6 includes a display section R61. The display section R61 includes a message for notifying the passenger that a point has been provided. Here, the message "Thank you for your cooperation. Please check 10 points that have been rewarded to you," is displayed in the display section R61. In this manner, the passenger who inputs a determination result can acknowledge that the points have been rewarded.

As described above, according to the present embodiment, an incentive is provided to a person who inputs a determination result. Accordingly, a passenger can be provided with motivation to input a determination result, and a situation where no determination result is input forever can be avoided.

Variation of the Second Embodiment

Hereinafter, variations of the second embodiment will be described. Note that these variations are also applicable to embodiments described above and later.

(1) In the above description, a passenger is identified as the identification request is transmitted from the passenger terminal 4. However, the present disclosure is not limited to this, and a person may be identified from an image. In this case, a camera (not shown) is preferably provided in the input and output terminal 13, and the camera preferably shoots a face of a passenger prior to input of a determination result. In this case, a shooting button is preferably provided in the presentation image G5 illustrated in FIG. 9 and the passenger is preferably caused to press the shooting button, so that the input and output terminal 13 shoots a face of a passenger. Image data of a face of a passenger that has been shot is transmitted from the input and output terminal 13 to the server 2 via the information processing apparatus 14, and the operator identification unit 221 of the server 2 preferably identifies the passenger using the image data.

(2) In the above description, in a case where the QR code is read by the passenger terminal 4, the identification request is transmitted from the passenger terminal 4 to the server 2 via the input and output terminal 13 and the information processing apparatus 14. However, the present disclosure is not limited to this. For example, in a case where the QR code is read by the passenger terminal 4, the identification request may be directly transmitted from the passenger terminal 4 to the server 2.

(3) In the above description, the server 2 and the external server 3 are described as separate servers. However, the function of the external server 3 may be provided to the server 2. In this case, the server 2 manages a point owned by each passenger.

(4) In the above description, it is described that a point is provided to a passenger who has input a determination result. However, the present disclosure is not limited to this, and if a boarding card is employed as a point card, a mode in which the fare is discounted may be employed. Further, a mode in which a coupon, such as a gift certificate, is provided to a passenger may be employed. In this case, a mode in which the coupon is mailed to a passenger on a later date may be employed, or a mode in which the coupon is electronically recorded on a card of a department store or the like may be employed.

(5) In the above description, the presentation image is described as being displayed on the input and output terminal 13. However, the present disclosure is not limited to this, and the presentation image may be displayed on the passenger terminal 4. In this case, since a passenger can input a determination result from his or her passenger terminal 4, the input can be easily performed.

Third Embodiment

When a mode in which a plurality of the input and output terminals 13 are installed in a vehicle is employed, it is assumed that determination results are input by a plurality of passengers. In this case, if the determination results are different depending on the passengers, it is difficult to determine a determination result of which passenger needs to be employed. Therefore, in a third embodiment, one passenger is identified from passengers in the vehicle, and the passenger is caused to input a determination result. Note that, in the present embodiment, it is assumed that the input and output terminals 13 are provided corresponding to a plurality of the seats 1*a*.

Figure 10:
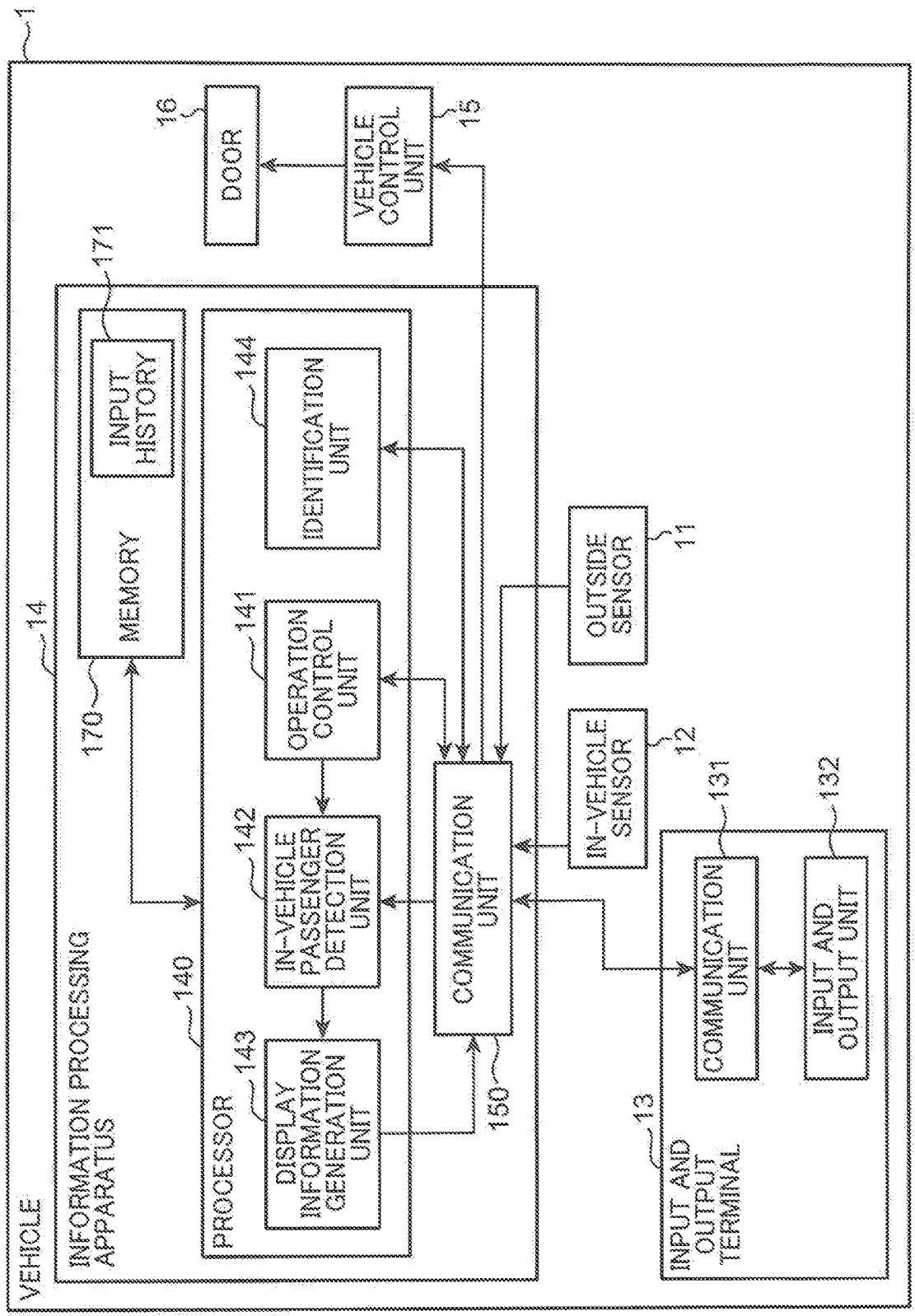
FIG. 10 is a block diagram illustrating a configuration of a vehicle to which the information processing apparatus according to a third embodiment is applied.

FIG. 10 is a block diagram illustrating a configuration of the vehicle 1 to which the information processing apparatus 14 according to the third embodiment is applied. The present embodiment is different from the first embodiment in that the processor 140 is further provided with an identification unit 144 and a memory 170 is provided in the information processing apparatus 14.

The memory 170 is configured with, for example, a semiconductor memory, and stores an input history 171. The input history 171 associates and stores user identification information of a passenger who has input a determination result, whether or not the determination result is correct, and input date and time of the determination result. As the user identification information, for example, a feature amount of an image indicating a passenger who has input a determination result extracted from the sensing data acquired by the in-vehicle sensor 12 is preferably employed.

When a determination result is input by a passenger, the display information generation unit 143 identifies a passenger who has input the determination result from the sensing data acquired by the in-vehicle sensor 12. In this case, the display information generation unit 143 preferably specifies coordinates of the sensing data corresponding to an installation position of the input and output terminal 13 to which the determination result is input, and identifies a passenger positioned closest to the coordinates as a passenger who has input the determination result.

Then, the display information generation unit 143 preferably determines whether or not the determination result is correct by analyzing the sensing data acquired by the in-vehicle sensor 12 from when the determination result is input until the vehicle 1 departs. For example, in a case where a determination result that there is a person who is likely to get on the vehicle is input, the display information generation unit 143 determines that the determination result is "incorrect" if a person who gets on the vehicle cannot be detected from the sensing data until the vehicle 1 departs after the input, and determines that the determination result is "correct" if a person who gets on the vehicle can be detected from the sensing data.

On the other hand, in a case where determination result that there is no person who is likely to get on the vehicle is input, the display information generation unit 143 determines that the determination result is "correct" if no person who gets on the vehicle can be detected from the sensing data until the vehicle 1 departs after the input, and determines that the determination result is "incorrect" if a person who gets on the vehicle can be detected. Then, the display information generation unit 143 associates the user identification information of the passenger who has input the determination result, the information ("correct" or "incorrect") indicating correctness or incorrectness of the determination result, and the input date and time, and inputs them in the input history 171.

Here, it is assumed that the input history 171 stores correctness and incorrectness of a determination result of a passenger after the vehicle 1 starts operation according to a current operation schedule. However, this is an example, and the input history 171 may store not only correctness and incorrectness of a determination result in the current operation schedule but also correctness and incorrectness of a determination result of a passenger in operation of the vehicle 1 in the past.

The identification unit 144 acquires sensing data acquired by the in-vehicle sensor 12 via the communication unit 150, and identifies one passenger who inputs a determination result using the acquired sensing data and the input history 171. Hereinafter, one passenger who identified is described as an identified passenger.

For example, when an identification timing of the identified passenger is reached at a departure time, the identification unit 144 extracts a passenger currently in the vehicle by using the sensing data acquired by the in-vehicle sensor 12. In this case, the identification unit 144 may omit a passenger who is about to get off at a bus stop from the passenger to be extracted. Then, the identification unit 144 preferably reads out correctness or incorrectness of a determination result of the extracted passenger from the input history 171, and identifies a passenger with a largest number of determination results determined as "correct" as the identified passenger.

Here, in a case where there are a plurality of passengers with a largest number of determination results determined as "correct", the identification unit 144 may identify (1) a passenger seated closer to an entrance as the identified passenger, (2) a passenger seated on a window side as the identified passenger, or (3) the identified passenger based on age. The reason why (1) and (2) are employed is based on the idea that a passenger seated near the entrance or a passenger sitting on the window side can easily visually recognize a person who runs to the entrance. Therefore, the reliability of a determination result can be enhanced by authorizing a passenger seated near the entrance to input a determination result.

When the mode of (3) is employed, for example, a method that identifies a passenger whose determination result is reliable based on his or her age is preferentially identified as the identified passenger is preferably employed. For example, there is a high possibility that an infant or a child inputs a determination result playfully. Further, there is a high possibility that an elderly person inputs an incorrect determination result since his or her cognitive ability is deteriorated due to aging. Therefore, for example, an age group of 15 to 60 years old can be employed as a reliable age group. When the mode of (3) is employed, the identification unit 144 preferably estimates the age of each passenger from the feature amount of the image of each passenger included in the sensing data of the in-vehicle sensor 12.

Note that, immediately after the start of operation of the vehicle 1, the input history 171 does not store the correctness and incorrectness of a determination result. In this case, the identification unit 144 may randomly identify one passenger as the identified passenger among passengers in the vehicle, or may identify the identified passenger by using the modes of (1) to (3).

Here, although the identification unit 144 is described as identifying the identified passenger by first referring to the input history 171, the present disclosure is not limited to this. The identification unit 144 may identify, without referring to the input history 171, the identified passenger by using any one of the above modes of (1) to (3), or may identify the identified passenger by combining the modes of (1) to (3). When the modes of (1) to (3) are combined, an evaluation value is preferably calculated for each of the modes of (1) to (3), and a passenger with a largest total value of the evaluation values is preferably identified as the identified passenger.

Figure 11:
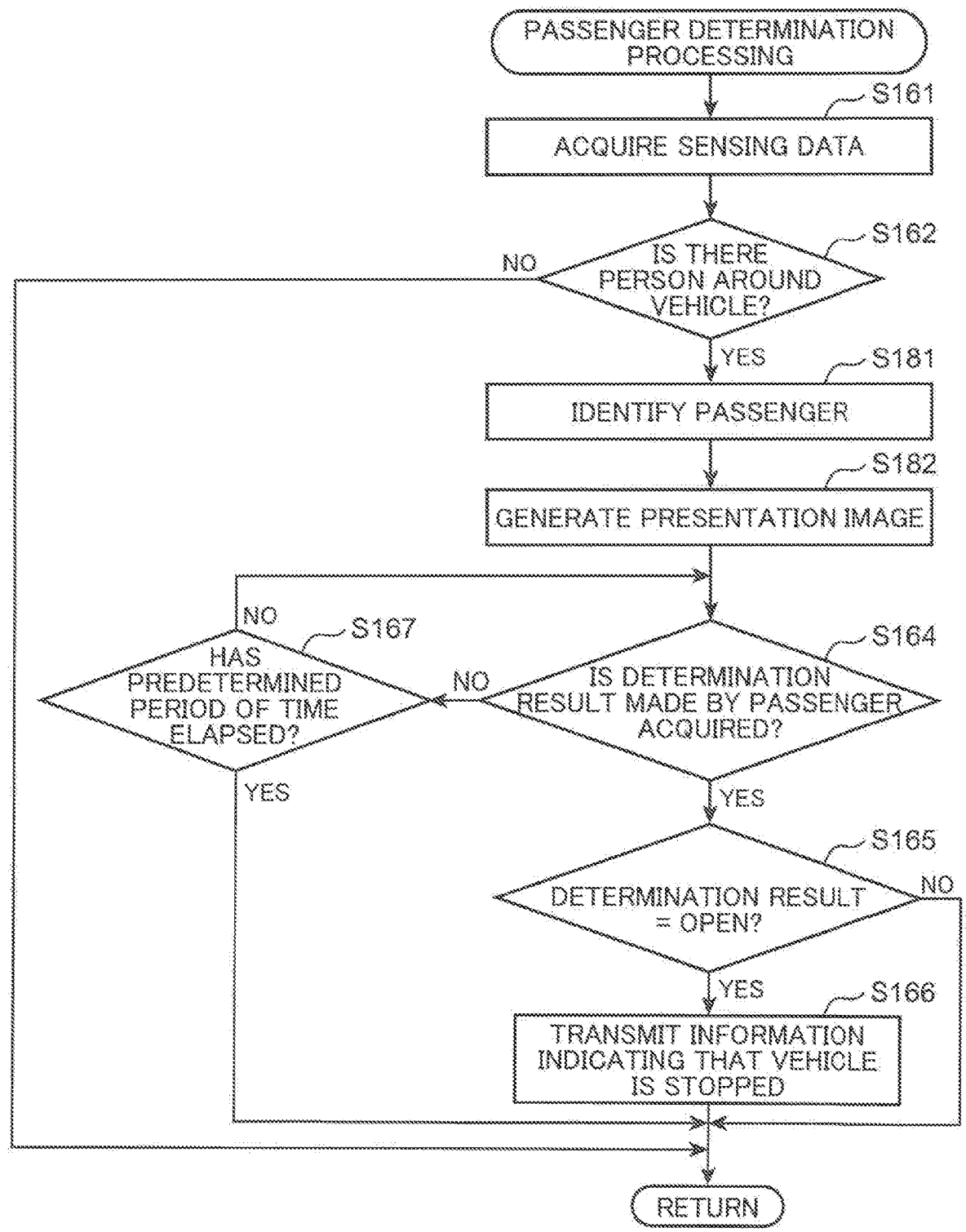
FIG. 11 is a flowchart illustrating the passenger determination processing according to the third embodiment.

FIG. 11 is a flowchart illustrating the passenger determination processing according to the third embodiment. In FIG. 11, the same processing as that of FIG. 4 is attached with the same reference numeral and omitted from description.

In S181 following S162, the identification unit 144 identifies the identified passenger who inputs a determination result by using the input history 171 and the sensing data.

In S182, the display information generation unit 143 identifies the input and output terminal 13 corresponding to the identified passenger, and causes only this one of the input and output terminal 13 to display the presentation image. Here, as the corresponding input and output terminal 13, the input and output terminal 13 attached to the back of the seat 1a in the front row of the seat 1a on which the identified passenger is seated, or the pipe 1b near the seat 1a on which the identified passenger is seated, is employed.

This allows only the designated passenger to input a determination result. Then, if the identified passenger inputs a determination result to the presentation image, processing of and after S164 explained in FIG. 4 is executed.

As described above, according to the present embodiment, only a passenger identified as the identified passenger can input a determination result. Accordingly, for example, the determination can be entrusted to a passenger who is highly reliable based on a determination result in the past, and reliability of determination can be enhanced.

Variation of the Third Embodiment (1) Although it is described in S182 of FIG. 11 that the presentation image is displayed only on the input and output terminal 13 corresponding to the identified passenger, the present disclosure is not limited to this. For example, a mode, in which the presentation image is displayed on all the input and output terminals 13 and only input of a determination result of the identified passenger is accepted, may be employed. In this case, the identification unit 144 transmits a feature amount of an image of the identified passenger to the input and output terminal 13 in advance. Then, the input and output terminal 13 shoots a passenger who operates the presentation image with the camera, and collates a feature amount of an image of the shot passenger with the feature amount of the image of the identified passenger transmitted in advance. In this manner, whether or not the passenger who operates the presentation image is the identified passenger can be determined. Then, in a case of determining that the passenger is the identified passenger, the input and output terminal 13 preferably accepts operation from the passenger, and in a case of determining that the passenger is not the identified passenger, the input and output terminal 13 does not preferably accept operation from the passenger.

(2) In S182 of FIG. 11, the presentation image may be displayed on the passenger terminal 4 held by the identified passenger. In this case, a communication address of the passenger terminal 4 of the identified passenger is stored in advance in the memory 170 of the information processing apparatus 14. The information processing apparatus 14 preferably stores the communication address of the passenger terminal 4 in the memory 170, for example, by imposing user registration on a passenger at the time of getting on.

Fourth Embodiment

Figure 12:
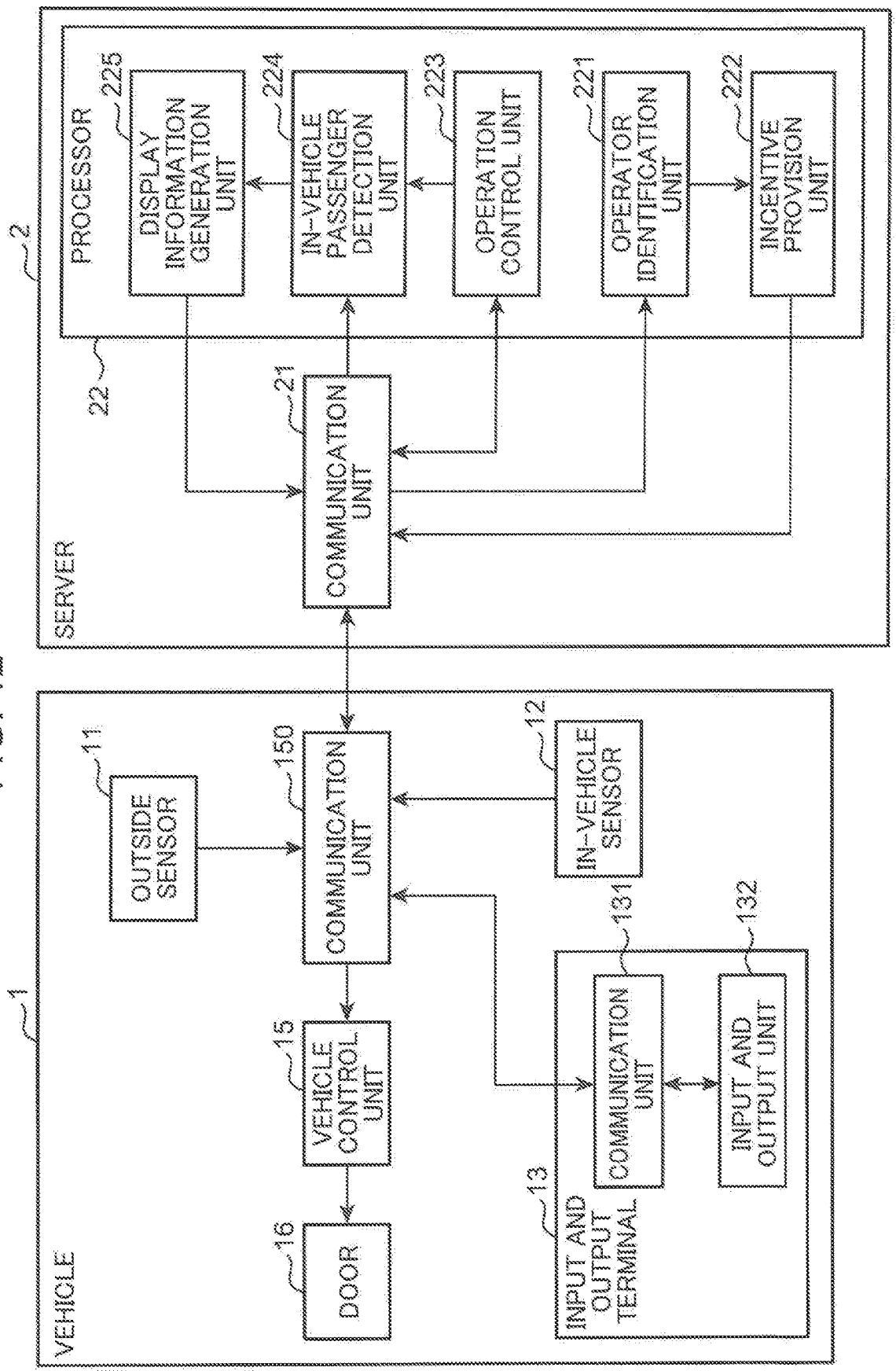
FIG. 12 is a block diagram illustrating a configuration of the vehicle management system to which the information processing apparatus according to a fourth embodiment is applied.

A fourth embodiment causes the server 2 to execute the processing that the processor 140 of the vehicle 1 executes. FIG. 12 is a block diagram illustrating a configuration of the vehicle management system to which the information processing apparatus 14 according to the fourth embodiment is applied.

FIG. 12 differs from FIG. 7 in that the processor 140 is omitted from the information processing apparatus 14 and the operation control unit 141, the in-vehicle passenger detection unit 142, and the display information generation unit 143 included in the processor 140 are provided in the server 2.

Specifically, the processor 22 of the server 2 includes an operation control unit 223, an in-vehicle passenger detection unit 224, and a display information generation unit 225 in addition to the operator identification unit 221 and the incentive provision unit 222 illustrated in FIG. 7. Details of these blocks are the same as those in the embodiments described above.

Specifically, the communication unit 150 transmits the sensing data acquired by the outside sensor 11 and the in-vehicle sensor 12 to the server 2, and the communication unit 21 of the server 2 receives the sensing data. Then, the operation control unit 223, the in-vehicle passenger detection unit 224, and the display information generation unit 225 execute various types of processing by using the sensing data received by the communication unit 21. Further, the display information generation unit 225 causes the generated presentation image to be transmitted to the vehicle 1 by using the communication unit 21 to display the presentation image on the input and output terminal 13. Further, the operation control unit 223 controls the operation of the vehicle 1 by transmitting various control commands to the vehicle 1 by using the communication unit 21. Further, a determination result of the passenger input to the input and output terminal 13 is transmitted to the server 2 via the communication unit 150, and the operation control unit 223 controls the opening and closing of the door 16 according to the determination result.

As described above, in the present embodiment, even in a ease where the function of the information processing apparatus 14 is provided in the server 2, the same effect as that of the above-described embodiment can be obtained.

INDUSTRIAL APPLICABILITY

The present disclosure is useful for a ride share service using a driverless automatic vehicle.

This application is based on Japanese Patent application No. 2018-161784 filed in Japan Patent Office on Aug. 30, 2018 and Japanese Patent application No. 2019-081257 filed in Japan Patent Office on Apr. 22, 2019, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An information processing apparatus which is configured to:
   acquire first sensing data from a first sensor that performs sensing of an object outside a vehicle;
   generate presentation information based on the first sensing data and cause a presentation device present in the vehicle to present the presentation information;
   acquire input data for presentation of the presentation information via an input device present in the vehicle; and
   control boarding of a person on the vehicle according to the input data.

2. The information processing apparatus according to claim 1, wherein
   the presentation information includes an image,
   the input data includes operation data indicating operation on an operation image, and
   the information processing apparatus is configured to generate the operation image.

3. The information processing apparatus according to claim 2, wherein
   the operation image includes an image for operating an entrance door of the vehicle, and
   the information processing apparatus is configured to control the entrance door according to operation indicated by the operation data.

4. The information processing apparatus according to claim 2, wherein
   the operation image includes an image for selecting whether or not there is a person who is trying to get on the vehicle, and
   the information processing apparatus is configured to control an entrance door of the vehicle according to operation indicated by the operation data.

5. The information processing apparatus according to claim 2, wherein
   the presentation information includes an image that emphasizes a person shown in an image.

6. The information processing apparatus according to claim 2, wherein
   the presentation information includes an image that shows movement of a person shown in an image.

7. The information processing apparatus according to claim 1, wherein the information processing apparatus is configured to acquire second sensing data from a second sensor that is attached to the vehicle and perform sensing of the inside of the vehicle,
   the information processing apparatus is further configured to identify a person in the vehicle using the second sensing data, wherein
   the information processing apparatus is configured to cause the presentation device to present the presentation information to the identified person.

8. The information processing apparatus according to claim 7, wherein
   the information processing apparatus is configured to identify a person by using a history of the input data.

9. The information processing apparatus according to claim 1, wherein
   the information processing apparatus is configured to acquire second sensing data from a second sensor that is attached to the vehicle and perform sensing of the inside of the vehicle,
   the information processing apparatus is further-configured to determine whether or not there is a person in the vehicle using the second sensing data, wherein
   the information processing apparatus is configured to cause the presentation device to present the presentation information in a case where the information processing apparatus is configured to determine that there is the person in the vehicle.

10. The information processing apparatus according to claim 1, the information processing apparatus is further configured to:
    identify a person who has made an input to the input device; and
    provide an incentive to the identified person.

11. The information processing apparatus according to claim 1, wherein
    the input device includes a communication terminal which is carried by a person in the vehicle and communicates with the information processing apparatus, and
    the information processing apparatus is configured to acquire the input data from the communication terminal through communication.

12. The information processing apparatus according to claim 1, wherein
    the presentation device includes a communication terminal which is carried by a person in the vehicle and communicates with the information processing apparatus,
    the information processing apparatus is configured to transmit the presentation information to the communication terminal, and
    the communication terminal presents the presentation information transmitted.

13. An information processing method by executing a computer, comprising:
    acquiring first sensing data from a first sensor that performs sensing of an object outside vehicle;
    generating presentation information based on the first sensing data and causing a presentation device present in the vehicle to present the presentation information;
    acquiring input data for presentation of the presentation information via an input device present in the vehicle; and outputting control information for controlling boarding of a person on the vehicle according to the input data.

\* \* \* \* \*